ized or adjusted under 35
(12) United States Patent
Aboerjaib

(10) Patent No.: US 12,514,487 B2
(45) Date of Patent: *Jan. 6, 2026

(54) SYSTEM AND METHOD FOR DETECTING BRAIN ABNORMALITIES USING BACKSCATTERED RADIATION

(71) Applicant: Sarah Y.Y. Aboerjaib, Kuwait (KW)

(72) Inventor: Sarah Y.Y. Aboerjaib, Kuwait (KW)

(73) Assignee: GIFTEDNESS AND CREATIVITY COMPANY, Safat (KW)

( * ) Notice: Subject to any disclaimer, the term of this patent is extended or adjusted under 35 U.S.C. 154(b) by 0 days.

This patent is subject to a terminal disclaimer.

(21) Appl. No.: 19/185,683

(22) Filed: Apr. 22, 2025

(65) Prior Publication Data

US 2025/0248639 A1 Aug. 7, 2025

Related U.S. Application Data

(63) Continuation-in-part of application No. 18/771,134, filed on Jul. 12, 2024, now Pat. No. 12,303,284.
(Continued)

(51) Int. Cl.
*A61B 5/00* (2006.01)
*A61B 5/05* (2021.01)
*G16H 50/20* (2018.01)

(52) U.S. Cl.
CPC .......... *A61B 5/4064* (2013.01); *A61B 5/0075* (2013.01); *A61B 5/0082* (2013.01);
(Continued)

(58) Field of Classification Search
CPC ... A61B 5/4064; A61B 5/0075; A61B 5/0082; A61B 5/05; A61B 5/6803; A61B 5/7203;
(Continued)

(56) References Cited

U.S. PATENT DOCUMENTS 5,987,346 A * 11/1999 Benaron .............. A61B 5/1459
600/475
10,441,211 B1 * 10/2019 Hajjiah ................ A61B 5/4504
(Continued)

FOREIGN PATENT DOCUMENTS

WO 2024118999 A1 6/2024

OTHER PUBLICATIONS

John P Van Houten, et al., "Imaging Brain Injury Using Time-Resolved Near Infrared Scanning", Pediatric Research 39, 470-476 (1996), First available online Mar. 1, 1996.
(Continued)

*Primary Examiner* — John R Downey
(74) *Attorney, Agent, or Firm* — Nath, Goldberg & Meyer; Joshua B. Goldberg

(57) ABSTRACT

A method of detecting brain abnormalities in a brain of a patient using backscattered light, the method can include: generating at least one pulsed incident beam of light with at
(Continued)

least one light source; directing the at least one pulsed incident beam of light toward a portion of the brain of the patient; applying an RF electromagnetic field toward the portion of the brain of the patient; receiving at least one backscattered beam of light from the portion of the brain of the patient; calculating an insertion loss ($I_L$) and an insertion phase difference ($I_{PD}$) of the at least one backscattered beam of light; and determining if the patient has a brain abnormality based on the calculated insertion loss and the calculated insertion phase difference.

20 Claims, 17 Drawing Sheets

Related U.S. Application Data

(60) Provisional application No. 63/534,126, filed on Aug. 23, 2023.

(52) U.S. Cl.
CPC .............. *A61B 5/05* (2013.01); *A61B 5/6803* (2013.01); *A61B 5/7203* (2013.01); *A61B 5/7225* (2013.01); *A61B 5/7257* (2013.01); *G16H 50/20* (2018.01); *A61B 2560/0462* (2013.01); *A61B 2562/0233* (2013.01)

(58) Field of Classification Search
CPC ................ A61B 5/7225; A61B 5/7257; A61B 2560/0462; A61B 2562/0233; A61B 5/0059; G16H 50/20
See application file for complete search history.

(56) References Cited

U.S. PATENT DOCUMENTS

| | | |
|---|---|---|
| 2014/0243681 A1 | 8/2014 | Hielscher |
| 2021/0263320 A1 | 8/2021 | Seidman |

OTHER PUBLICATIONS

Maurizio Ce, et al., "Artificial Intelligence in Brain Tumor Imaging: A Step toward Personalized Medicine", Curr Oncol. pp. 2673-2701, First available online Feb. 22, 2023.

Mahsa Arabahmadi, et al., "Deep Learning for Smart Healthcare—A Survey on Brain Tumor Detection from Medical Imaging", Sensors 2022, vol. 22, Issue 5, pp. 1-27, First available online Mar. 2, 2022.

Chaiyaporn Yuksen, et al. "Diagnostic properties of a portable near-infrared spectroscopy to detect intracranial hematoma in traumatic brain injury patients", European Journal of Radiology Open, vol. 7 (2020) 100246, pp. 1-4, First available online Jul. 29, 2020.

* cited by examiner

SYSTEM AND METHOD FOR DETECTING BRAIN ABNORMALITIES USING BACKSCATTERED RADIATION

CROSS-REFERENCE TO RELATED APPLICATIONS

This application claims the benefit of U.S. Non-Provisional Patent Application No. 2025, filed on Jul. 12, 2024, and U.S. Provisional Patent Application No. 63/534,126, filed on Aug. 23, 2023, each of which are hereby incorporated by reference in their entirety.

BACKGROUND

Field

The disclosure of the present application relates to medical diagnostic tools, and particularly to a system and a method for detecting brain abnormalities using backscattered near infrared (NIR) light.

Description of Related Art

Computed tomography (CT) scan evaluations of detecting brain abnormalities are frequently conducted in hospitals and clinics for the purpose of determining if a brain has a hemorrhage (bleeding internally due to an injury), a stroke, a tumor, damage, or the like. The vast majority of these evaluations reveal normal brain tissue, and the injury in such cases is typically labeled as a soft-tissue trivial injury. In such cases, the CT scan evaluation was unnecessary, resulting in an unnecessary exposure to X-ray radiation, as well as an unnecessary hospital visit with associated costs. Moreover, the process of a CT scan is time-consuming and the delay in obtaining CT scan results could be fatal, potentially resulting in a patient's deterioration or death from a stroke before appropriate intervention can be applied.

While portable and relatively inexpensive non-X-ray diagnostic devices such as ultrasound devices exist, such devices typically either require expert training in interpreting signals/images or are intended for highly specialized purposes. Although ultrasound devices may be useful for their intended application of providing information about soft tissue structure and function, the characteristics of ultrasound make it unsuitable for high-quality diagnostic images of the brain. Thus, medical technology currently uses significantly more expensive, cumbersome, and potentially dangerous test methods such as a CT scan analysis to identify acute structural changes in the brain, such as those that appear in hemorrhages or tumors.

Although a number of devices that utilize ultrasound or electromagnetic energy to visualize or make determinations about certain properties of brain tissue exist, such devices typically do not provide for ease of use or accuracy. Brain tissues vary greatly in their distance from the skin to the underlying brain, and in the characteristics of the tissues between them. A need therefore exists for a simple, low-cost, and portable system which is tolerant of a large degree of variability in user technique, and which is capable of producing a sensitive and specific indication of the likelihood of a bleeding vessel in the area of a brain injury or an abnormal growth of cells within the brain.

Although backscatter radiation detectors are used for medical imaging, such detectors typically use X-rays, thus not only making them very expensive but potentially damaging to the tissue. Backscatter technology is based on the Compton scattering effect of X-rays. Unlike a traditional X-ray machine, which relies on the transmission of X-rays through the object, backscatter X-ray detects the radiation that reflects from the object and forms an image. The backscatter pattern is dependent on the material property and is good for imaging organic material. The organic material, however, is still exposed to the ionizing X-rays, thus making them potentially dangerous for use as a detector for sensitive tissue, such as brain tissue. Thus, a system and a method using the same for solving the aforementioned problems are desired.

SUMMARY

The present subject matter, in one embodiment, relates to a method of detecting brain abnormalities in a brain of a patient using backscattered light, the method comprising the steps of: generating at least one pulsed incident beam of light with at least one light source; directing the at least one pulsed incident beam of light toward a portion of the brain of the patient; applying an RF electromagnetic field toward the portion of the brain of the patient; receiving at least one backscattered beam of light from the portion of the brain of the patient; calculating an insertion loss ($I_L$) and an insertion phase difference ($I_{PD}$) of the at least one backscattered beam of light; and determining if the patient has a brain abnormality based on the calculated insertion loss and the calculated insertion phase difference.

In an embodiment, the at least one pulsed incident beam of light can be near infrared light.

In another embodiment, the at least one pulsed incident beam of light and the RF electromagnetic field can be applied simultaneously toward the portion of the brain of the patient to modulate brain tissue dielectric properties.

In an additional embodiment, the modulation of the brain tissue dielectric properties can reduce scattering and absorption losses of photons of the near infrared light in the brain tissue.

In a supplementary embodiment, the brain tissue dielectric properties can include complex permittivity ($\epsilon^*$) and permeability ($\mu^*$).

In a further embodiment, the method can further include: prior to the calculation step, generating two output analog voltages via a comparator microchip based on signals from the at least one backscattered beam of light and the RF electromagnetic field; and digitizing the two output analog voltages to generate multiple discrete iterations of signal samples (s[n]).

In an embodiment, the calculated insertion loss ($I_L$) and the calculated insertion phase difference ($I_{PD}$) can be discrete time-domain digital signals based on the multiple discrete iterations of signal samples (s[n]).

In another embodiment, the method can further include calculating a pulsed RF signal-frequency domain (R(f)) based on the discrete time-domain digital signals of the calculated insertion loss ($I_L$) and the calculated insertion phase difference ($I_{PD}$).

In an additional embodiment, the method can further include: generating a frequency-domain data by converting the discrete time-domain digital signals of the calculated insertion loss ($I_L$) and the calculated insertion phase difference ($I_{PD}$) to frequency-domain using a Fourier transform; reducing noise on the generated frequency-domain data; and calculating a frequency spectrum (S(f)) based on the noise reduced frequency-domain data.

In a supplementary embodiment, the method can further include calculating a cross-spectral density ($S_{xy}(f)$) based on the calculated pulsed RF signal-frequency domain (R(f)) and the calculated frequency spectrum (S(f)).

In a further embodiment, the method can further include: sampling signals of the at least one pulsed incident beam of light to obtain sampled pulsed signals; optionally applying a window function to each of the sampled pulsed signals; and applying a discrete Fourier transform to each of the sampled pulsed signals to compute a frequency-domain representation (S[k]).

In an embodiment, the cross-spectral density ($S_{xy}$(f)) and the frequency-domain representation (S[k]) can be inputted into deep learning model integrations.

In another embodiment, the deep learning model integrations can be selected from the group consisting of convolutional neural networks (CNN), a long short-term memory (LSTM), a transformer module, an U-Net 2.5D module, and a combination thereof.

In an additional embodiment, the cross-spectral density ($S_{xy}$(f)) and the frequency-domain representation (S[k]) can be inputted into the convolutional neural networks (CNN) to extract local spatial features data from the discrete time-domain digital signals of the calculated insertion loss ($I_L$) and the calculated insertion phase difference ($I_{PD}$).

In a supplementary embodiment, the extracted local spatial features data can be inputted into the long short-term memory (LSTM) for capturing temporal dependencies in sequential data thereby detecting dynamic changes in brain activity.

In an embodiment, the captured temporal dependencies can be combined with the transformer module to capture global context data and long-range dependencies data in the at least one backscattered beam of light data.

In another embodiment, the captured global context data and the long-range dependencies data can be input into an encoder-decoder architecture with skip connections within the U-Net 2.5D module to segment the respective data thereby localizing abnormalities and preserving spatial resolution during upsampling.

In a further embodiment, the present subject matter relates to a method of detecting brain abnormalities in a brain of a patient using backscattered light, the method can include the steps of: generating at least one pulsed incident beam of light with at least one light source; directing the at least one pulsed incident beam of light toward a portion of the brain of the patient; receiving at least one backscattered beam of light from the portion of the patient's brain; calculating an insertion loss, $I_L$, as $$I_L = 20\log\frac{A_{BS}}{A_I},$$

wherein $A_{BS}$ is an amplitude of the at least one backscattered beam of light, and wherein $A_I$ is an amplitude of the at least one pulsed incident beam of light; calculating an insertion phase difference, $I_{PD}$, as $I_{PD}=\phi_{BS}-\phi_I$, wherein $\phi_{BS}$ is a phase of the at least one backscattered beam of light, and wherein $\phi_I$ is a phase of the at least one pulsed incident beam of light; and determining if the patient has a brain abnormality based on the calculated insertion loss and the calculated insertion phase difference.

In an embodiment, the method can further include measuring the amplitude of the at least one backscattered beam of light and the phase of the at least one backscattered beam of light using a comparator microchip prior to the steps of calculating the insertion loss and calculating the insertion phase difference.

In a further embodiment, the present subject matter relates to a system for detecting brain abnormalities in a brain of a patient using backscattered light, the system can include: a headband which can be configured to be worn on a head of a patient, wherein the headband can include: at least one light source configured to generate at least one pulsed incident beam of light directed toward a portion of the brain of the patient; at least one detector configured to detect at least one backscattered beam of light from the portion of the brain of the patient; and a controller which can be configured to calculate an insertion loss, $I_L$, as $I_L=20\log_{A_I}^{A_{BS}}$ and an insertion phase difference, $I_{PD}$, as $I_{PD}=\phi_{BS}-\phi_I$, wherein $A_{BS}$ is an amplitude of the at least one backscattered beam of light, wherein $A_I$ is an amplitude of the at least one pulsed incident beam of light, wherein $\phi_{BS}$ is a phase of the at least one backscattered beam of light, and wherein $\phi_I$ is a phase of the at least one pulsed incident beam of light; wherein the controller can be configured to determine if the patient has a brain abnormality based on the calculated insertion loss and the calculated insertion phase difference.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
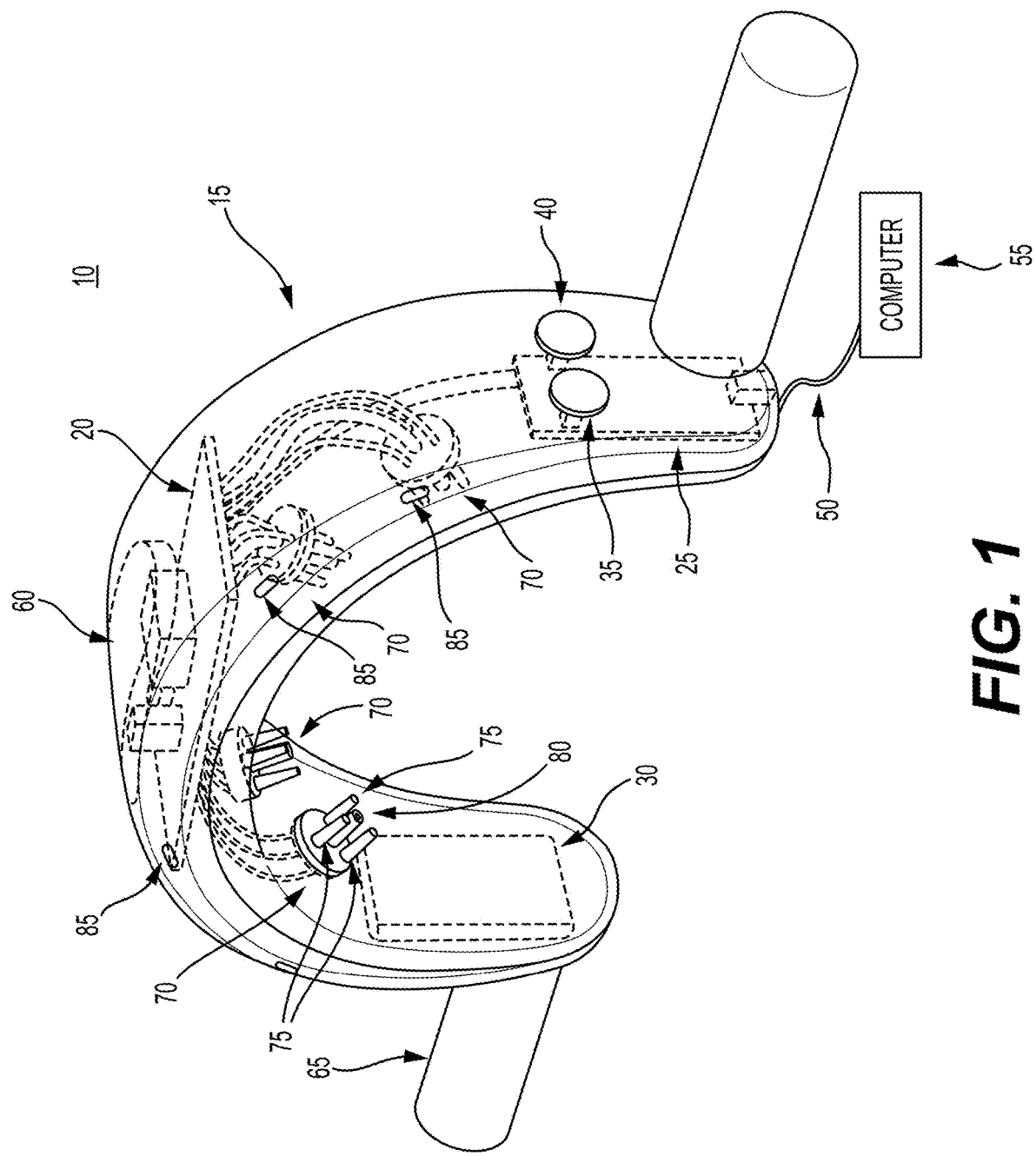
FIG. 1 is a perspective view of a system for detecting brain abnormalities.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, percentage ranges or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

"Subject" as used herein refers to any animal classified as a mammal, including humans, domestic and farm animals, and zoo, sports, and pet companion animals such as household pets and other domesticated animals such as, but not limited to, cattle, sheep, ferrets, swine, horses, poultry, rabbits, goats, dogs, cats and the like.

"Patient" as used herein refers to a subject in need of treatment or diagnosis of a condition, disorder, or disease, such as diagnosis of a brain condition.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

FIGS. 1-4 depict a system and a method for detecting brain abnormalities using backscattered near infrared (NIR) light for determining and detecting for the presence of any or all of a healthy brain, brain damage, brain tumor, brain hemorrhage, brain ischemic stroke, and the like. In this regard, FIGS. 1-4 show a system 10 for implementing the method of detecting brain abnormalities using backscattered NIR light including a scalp-engaging optical interface structure in the form of a substantially U-shaped headband 15. Within a housing of the headband 15, there is a first printed circuit board assembly (PCBA) 20, a second printed circuit board assembly (PCBA) 25, a removable battery 30, and wiring connections. The second printed circuit board assembly 25, which is in communication with the first printed circuit board assembly 20 via the wiring connections, can include a calibration button 35 and a reset 40 configured for scanning of a healthy portion of a patient's brain 45 and diagnostic scanning for detecting brain abnormalities, respectively, as described herein.

In a non-limiting embodiment, the first printed circuit board assembly 20 can include a USB cable 50 attached thereto for connecting the headband 15 to a computer (i.e., by way of non-limiting example, a personal computer, smartphone, smart tablet, or other computers) 55 for data processing and analysis, thereby allowing the user to access the user interface for providing simple guided scan processes and display the results as described herein. While the USB cable 50 is used for connecting the headband 15 to the computer 55, it should be understood that other connection means such as Bluetooth® and Wi-Fi® can be substituted for the USB cable 50 without departing from the present subject matter.

In another non-limiting embodiment, the system 10 can include wireless communication (i.e., by way of non-limiting example, Bluetooth®, Wi-Fi®, or other wireless communications) for remote data transmission to cloud-based platforms thereby facilitating collaborative medical review and supporting telemedicine applications.

Situated above the first printed circuit board assembly 20 is an aluminum plate 60 configured for preventing temperature fluctuations on the first printed circuit board assembly 20. In certain embodiments, the aluminum plate 60 can be embedded fully within the housing of the headband 15. In other embodiments, the aluminum plate 60 can be partially exposed on the exterior surface of the housing of the headband 15. In a further non-limiting embodiment, the headband 15 can have a dimension of about 70 mm in width (W), about 140 mm in height (H), and about 380 mm in length (L).

On the outer exterior surfaces of the housing of the headband 15, there can be at least two handles 65 attached to the sides of the headband 15 for allowing a user to place the headband 15 on the patient's head, thereby permitting measurements of the patient's brain 45 as described herein. A display screen with a user interface integrated therein can be located on the outer exterior surface of the housing of the headband 15. The user interface can be configured to guide the user through the calibration process as described herein, direct the user to the scanning process across different regions of interest on the patient's brain, and display the type of brain abnormalities detected.

On the inner exterior surfaces of the housing of the headband 15, there can be a plurality of elements 70 mounted thereon which can individually be in communication with each of a plurality of light sources on the first printed circuit board assembly 20, as described herein. Each of the plurality of elements 70 can include a plurality of light projections 75 and a receiver 80 mounted thereon configured for directing incident beams of near infrared light (IBNIR) from the respective plurality of light sources onto a portion of the patient's brain 45 and receiving backscattered beams of near infrared light (BSBNIR) from the portion of the patient's brain 45, respectively, as described herein. In a non-limiting embodiment, the plurality of light projections 75 can be laser projections. In another non-limiting embodiment, the plurality of light projections 75 can be fiber optic laser transmitters.

On the front exterior surfaces of the housing of the headband 15, there can be a plurality of LED light indicators 85 corresponding to each of the plurality of elements 70 configured to indicate the type of brain abnormalities detected (i.e., brain damage, brain tumor, brain hemorrhage, ischemic stroke, or the like) or the detection of a healthy brain as described herein. In certain non-limiting embodiments, the plurality of LED light indicators 85 can include a green LED configured to indicate a healthy brain, a red LED configured to indicate a brain hemorrhage, an orange LED configured to indicate a brain tumor, a yellow LED configured to indicate a brain ischemic stroke, a purple LED configured to indicate a brain damage, and a blue LED configured to indicate calibration mode. It should be understood that while each of the mentioned colors have been assigned for the respective brain conditions and calibration mode in one embodiment, other colors may be assigned to the respective brains conditions and calibration mode without departing from the present subject matter.

Figure 4:
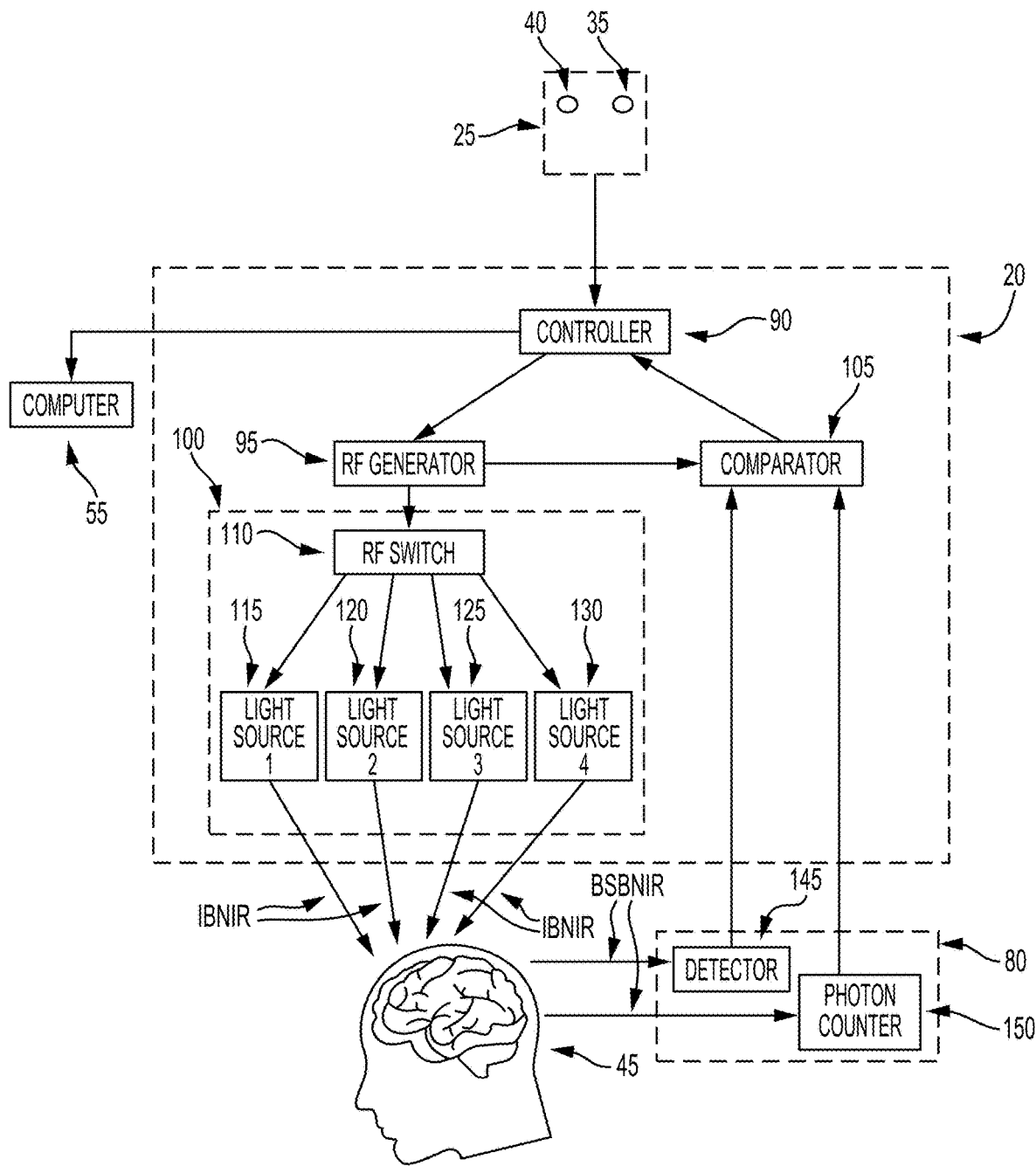
FIG. 4 is a block diagram of various subcomponents of the system of FIG. 1 and a method for detecting brain abnormalities using backscattered light.

As shown in FIG. 4, the mentioned first printed circuit board assembly 20 can include a controller 90, a radio frequency (RF) generator 95, a transmitter 100, and a comparator microchip 105. The controller 90 can be configured to send a signal to the RF generator 95 to generate pulsing incident beams of functional near-infrared light (IBNIR) coming from the transmitter 100 onto the patient's brain 45. While FIG. 4 shows the patient's brain 45, it should be understood that the patient's brain 45 is shown for exemplary purposes only.

The transmitter 100, which in certain non-limiting embodiments can be a vertical-cavity surface-emitting laser (VCSEL) or a Fabry-Perot laser, can include a radio frequency (RF) switch 110 and at least one light source for generating a pulsing incident beam of functional near infrared light (IBNIR). The RF switch 110 can be a SP3T RF switch manufactured by the Hittite Microwave Corporation of Massachusetts, as a non-limiting example. The at least one light source can be a multi-wavelength laser or light emitting diode (LED) source.

In a particular non-limiting example, the at least one light source can be a vertical-cavity surface-emitting laser (VCSEL), which can include a first light source 115, a second light source 120, a third light source 125, and a fourth light source 130, which can respectively generate functional near infrared light (fNIR) at wavelengths of about 650 nm to about 680 nm, about 760 nm, about 850 nm, and about 980 nm. In certain embodiments, this first wavelength can be any of 650 nm, 670 nm, and 680 nm. These wavelengths of fNIR have been used for spectroscopic measurements of brain tissue and can be used to accurately detect levels of oxygenated and deoxygenated hemoglobin using the properties of light absorption and scattering.

In an embodiment, the photons of the NIR light can interact with electrons within the hemoglobin (i.e., the oxygenated hemoglobin ($HbO_2$) and/or the deoxygenated hemoglobin (HbR)) within red blood cells. According to this embodiment, when the photons of the NIR light are absorbed by the hemoglobin, the electrons can be promoted to higher energy states (excited states such as vibrational and rotational transitions). Since the $HbO_2$ and the HbR have different absorption spectra due to their electronic configurations, targeting specific wavelengths (those mentioned above) by the at least one light source can allow for detection changes in the hemoglobin states (i.e., blood oxygenation) associated with the various brain conditions (i.e., healthy brain, brain damage, brain tumor, brain hemorrhage, brain ischemic stroke, and the like). As shown in Table 1, the behavior of the photons of the NIR light at about 660 nm, about 760 nm, and about 850 nm can provide insight on the type of brain condition.

TABLE 1

| Photon Interactions by Conditions | Healthy Brain Tissue Photon Behavior | Tumor Tissue Photon Behavior | Hemorrhagic Stroke (Intracerebral Hemorrhage) Photon Behavior | Ischemic Stroke Photon Behavior |
|---|---|---|---|---|
| Absorption | In healthy brain tissue, NIR light photonss can be absorbed by the $HbO_2$ and the HbR at various wavelengths. For example, when the NIR light is at about 660 nm and about 760 nm, there is moderate photons absorption by the HbR. However, when the NIR light is at about 850 nm and about 980 nm, there is moderate NIR light photons absorption by the $HbO_2$. | Brain tumor can cause irregular and heterogeneous composition (i.e., uneven and abnormal mixture of cells, blood vessels, and tissue structure found in tumor regions which can lead to varying oxygen levels and irregular vascular patterns) within the brain tissues with increased HbR due to hypoxia (low oxygen levels). When the NIR light is at about 760 nm, there is an increase in the NIR light photons absorption due to higher HbR concentration. | Hemorrhagic stroke can cause elevated pooled blood due to rupture of blood vessels which increases overall $HbO_2$ content. When the NIR light is at about 660 nm and about 760 nm, there is significant increase in the NIR light photons absorption (hence increased absorption coefficient $\mu_a$) due to high concentrations of $HbO_2$ and HbR. | Ischemic stroke can cause cerebral blood flow reduction due to blockage in blood vessels which can lead to increased HbR due to oxygen deprivation. When the NIR light is at about 760 nm, there is an increase in the NIR light photons absorption (hence increased absorption coefficient $\mu_a$) due to the elevated HbR levels. |
| Scattering | NIR light photons scatter off normal cellular structures (i.e., neurons, glial cells, and blood vessels in healthy brain tissue in which the cell density, organization, and morphology are consistent) in a predictable manner. | Altered tissue density and structure caused by brain tumor can cause an increase in scattering of the NIR light photons. | Blood pooling caused by hemorrhagic stroke can create a more homogeneous tissue structure and therefore alters scattering coefficients of the NIR light photons. | Tissue swelling (edema) caused by ischemic stroke can reduce scattering coefficient of the NIR light photons by altering refractive index (n) mismatches. |
| Reflection to detector | A consistent number of NIR light photons are reflected back and detected by the detector 145, thereby establishing a baseline for normal tissue. | Increased absorption and scattering of the NIR light photons can lead to a decrease in the NIR light photons detection by the detector 145. As a result, higher $I_L$ and altered $I_{PD}$ can help to identify tumor presence as described herein. | High NIR light photons absorption can lead to a marked reduction in detected NIR light photons by the detector 145. As a result, drastic changes in $I_L$ and $I_{PD}$ can help to identify hemorrhagic event as described herein. | Increased NIR light photons absorption and altered scattering properties of the NIR light photons can lead to a decrease in NIR light photons detection by the detector 145. As a result, changes in $I_L$ and $I_{PD}$ can help identify ischemic regions as described herein. |

Referring back to FIG. 4, the REF generator 95, which has a broadband frequency of about 30 MHz to about 1000 MHz, can be in communication with the RE switch 110 to modulate the first light source 115, the second light source 120, the third light source 125, and the fourth light source 130 thereby generating pulsing incident beams of functional near infrared light (IBNIR) at the respective wavelengths mentioned with the mentioned broadband frequency range. The RF generator 95 can be an Anritsu M S4623B network analyzer manufactured by the Anritsu Corporation of Japan, as a non-limiting example. In an embodiment, the RF generator 95 can be selected from the group consisting of an oscillator (not shown), a coil (not shown), an antenna (not shown), and a combination thereof.

In a non-limiting example, the RF generator 95 can include a first subsystem comprising the oscillator and the coil. The first subsystem can be configured to generate magnetic fields for targeting proton spin states within the brain tissue of the user as described herein. Conversely, in another non-limiting example, the RF generator 95 can include a second subsystem comprising the oscillator and the antenna. The second subsystem can be configured to radiate RF electromagnetic waves into the brain tissue of the user.

The oscillator, which is housed in the first printed circuit board assembly 20, can be used for generating a RF signal at the broadband frequency of about 30 MHz to about 1000 MHz. The coil can be integrated into the U-shaped headband 15 in close proximity to the scalp of the user and can be configured to create a magnetic field, when supplied with a current, to target specific brain regions of the user. The antenna can also be integrated into the U-shaped headband 15 in close proximity to the scalp of the user and can be configured to radiate the RF signal into the brain tissue of the user. The antenna can be selected from the group consisting of a loop antenna, a dipole antenna, a patch antenna, and a combination thereof.

In an embodiment, the pulsing of the incident beam(s) can lead to deeper penetration than a non-pulsed beam and can further allow for targeted absorption of the beam(s), as well as providing the ability to gather specific information about the brain structure(s). RF pulsing, as a non-limiting example, can enhance the efficiency of the transmission of the light signals through the tissues, resulting in improved penetration depth and enhancing the interaction between photons and tissue components, leading to better imaging capabilities. In an embodiment, the incident beam(s) can be pulsated at the mentioned broadband frequency range directly towards the brain regions while the RF electromagnetic fields can be applied thereto simultaneously to modulate the brain tissue dielectric properties (i.e., complex permittivity ($\epsilon^*$) and permeability ($\mu^*$) which represent how brain tissue respond to electric and magnetic fields), thereby reducing scattering and absorption losses of the NIR light photons in the brain tissue.

Specifically, the application of a pulsed RF electromagnetic field can modulate the energy states of electrons in the hemoglobin and influence proton (within hydrogen nuclei) spin states (i.e., the protons intrinsic spin angular momentum changes to align either parallel or antiparallel to the RF electromagnetic field). This can result in a reduction in scattering and absorption of the NIR light photons within the brain's water and lipid molecules, thereby modulating the brain tissue dielectric properties (complex permittivity ($\epsilon^*$) and permeability ($\mu^*$)) as mentioned. As a result, NIR light penetration depth and signal clarity (i.e., detection of the brain abnormalities) can be improved.

The rate of absorption and scattering of the emitted NIR light photons can vary depending on the brain tissue composition, the hemoglobin state (i.e., oxygenated hemoglobin ($HbO_2$) and/or deoxygenated hemoglobin (HbR)), and any brain abnormalities that may be present. In a non-limiting embodiment, modulating the complex permittivity ($\epsilon^*$) and the permeability ($\mu^*$) through RF electromagnetic field pulsing can reduce the scattering and absorption losses of the NIR light photons by minimizing mismatches in the refractive indexes of the NIR light and optimizing the dielectric environment for NIR light propagation. In another non-limiting embodiment, modulating the complex permittivity ($\epsilon^*$) and the permeability ($\mu^*$) can make the refractive indexes of the NIR light more uniform throughout the tissue. As a result, the amount of scattering at interfaces between different tissue components can be reduced and absorption coefficients can be affected thereby reducing energy loss and creating a dielectric effect environment.

A more homogeneous dielectric environment via modulation of the complex permittivity ($\epsilon^*$) and the permeability ($\mu^*$) can allow the NIR light photons to travel deeper within the brain tissue with fewer interactions, thereby increasing the NIR light photons penetration depth resulting in a higher intensity of the NIR light photons within the deeper portions of the brain tissue and a better signal-to-noise ratio (SNR). SNR is directly correlated with enhanced penetration depth of the NIR light photons whereby clearer backscattered NIR signals, which are detected by the detector 145 as described herein, for analysis can be achieved as more NIR light photons reach deeper brain tissue layers.

In an embodiment, the modulation of the complex permittivity ($\epsilon^*$) and the permeability ($\mu^*$) through RF electromagnetic field pulsing can also reduce the attenuation coefficients for the NIR light thereby allowing the NIR light photons to traverse greater distances within the brain tissue before being absorbed or scattered which increases the effective penetration depth of the NIR light photons. As a result, higher concentration of backscattered NIR light photons, as described herein, from deeper brain tissue layers can be achieved thereby enhancing signal fidelity.

The path in which the NIR light photons travel within the brain tissue can be described by an anisotropy factor (g) which is a dimensionless parameter by the following equation:

$$g = \langle \cos\theta \rangle \qquad \text{(Eq. 1)}$$

wherein cos θ is an average cosine of the scattering angle (θ).

Within the brain tissue, when g is equal to 1, 0, and −1, the NIR light photons can scatter entirely in the forward direction (greater penetration depth), scatter isotropically (equal in all directions), and scatter entirely backward (less penetration depth), respectively.

The signals from the pulsating incident beam(s) and the RF electromagnetic fields can be detected by the detector 145. The combined signals (the mentioned backscattered NIR signals) detected by the detector 145 can be expressed by the following equation:

$$S(t) = \alpha \cdot \varepsilon(\lambda) \cdot c_H(t) \cdot N(t) \cdot [1 + \beta \cdot M_{RF}(t) \cdot \sin(\phi_{RF}(t))] \cdot e^{-\gamma \cdot B_{RF}(t)} \quad \text{(Eq. 2)}$$

wherein,
α and β are calibration constants (obtained during the calibration of the system 10 and stored in the controller 90 as described herein);
ε(λ) is the molar absorptivity of hemoglobin at wavelength λ;
$c_H(t)$ is the concentration of hemoglobin at time t;

$$N(t) = \frac{I(t) \cdot \lambda}{h \cdot c}$$

is the number of photons per unit time;
I(t) is the intensity of NIR light;
λ is the NIR wavelength;
h is Planck's constant (6.626×10⁻³⁴ Js);
c is the speed of light in a vacuum (3×10⁸ m/s);
$M_{RF}(t)$ and $\phi_{RF}(t)$ are the magnitude and phase of the RF signal, respectively;

γ represents the influence of RF-induced dielectric changes; and $B_{RF}(t)$ is the magnetic field strength of the RF field at time t.

Taking into account RF-induced modification with Beer-Lambert law, light absorption to the properties of the material (i.e., brain tissue) through which light is travelling can be expressed by the following equation:

$$A(\lambda) = \epsilon(\lambda) \cdot c_H(t) \cdot d \cdot [1 + \beta \cdot M_{RF}(t) \cdot \sin(\phi RF(t))] \cdot e^{-\gamma \cdot B_{RF}(t)} \quad \text{(Eq. 3)}$$

wherein,
- $A(\lambda)$ is the absorbance at wavelength $\lambda$;
- $\epsilon(\lambda)$ is the molar absorptivity of hemoglobin at wavelength $\lambda$;
- $c_H(t)$ is the concentration of hemoglobin at time t;
- d is the path length of NIR light through the tissue;
- β is a calibration constant (obtained during the calibration of the system 10 and stored in the controller 90 as described herein);
- $M_{RF}(t)$ and $\phi_{RF}(t)$ are the magnitude and phase of the RF signal, respectively;
- γ represents the influence of RF-induced dielectric changes; and
- $B_{RF}(t)$ is the magnetic field strength of the RF field at time t.

The effective penetration depth (δ) mentioned above can be estimated by the following equation:

$$\delta = \frac{1}{\mu_a + \mu'_s} \quad \text{(Eq. 4)}$$

wherein,
- $\mu_a$ is the absorption coefficient; and
- $\mu'_s$ is the reduced scattering coefficient ($\mu'_s = \mu_s(1-g)$, with g being the anisotropy factor).

Increasing the RF field strength ($B_{RF}$) can lead to a reduction in both absorption and scattering coefficients, thereby increasing the effective penetration depth (6) as expressed by the following equation:

$$\delta_{RF} = \frac{1}{(\mu_a - \gamma B_{RF}) + (\mu'_s - \gamma' B_{RF})} \quad \text{(Eq. 5)}$$

wherein,
γ and γ' are coefficients representing the reduction in absorption and scattering due to RF modulation.

In an embodiment, the RF energy can cause localized dielectric heating thereby raising the temperature of the brain tissue. This temperature increase can affect the molecular motions of water molecules and other biomolecules (primarily involving hydrogen protons and electron orbitals), thereby transiently altering the tissue's optical properties such as refractive index and scattering coefficients of the NIR light photons.

The dielectric heating can induce changes in the refractive index of the brain tissue thereby affecting propagation of the NIR light. In this context, a higher refractive index gradient can lead to an increase of NIR light photons scattering. Conversely, a lower refractive index gradient can facilitate deeper penetration of the NIR light photons into the brain tissue. In an embodiment, the RF energy can be tuned to achieve a desired dielectric heating without damaging the brain tissue.

The refractive index mentioned is temperature dependent n(T) and can be expressed by the following equation:

$$n(T) = n_0 + \alpha \Delta T n \quad \text{(Eq. 6)}$$

wherein,
- $n_0$ is the refractive index at baseline temperature (small temperature changes can alter n, affecting how light propagates);
- α is the thermal coefficient; and
- ΔT is the change in temperature.

Figure 5:
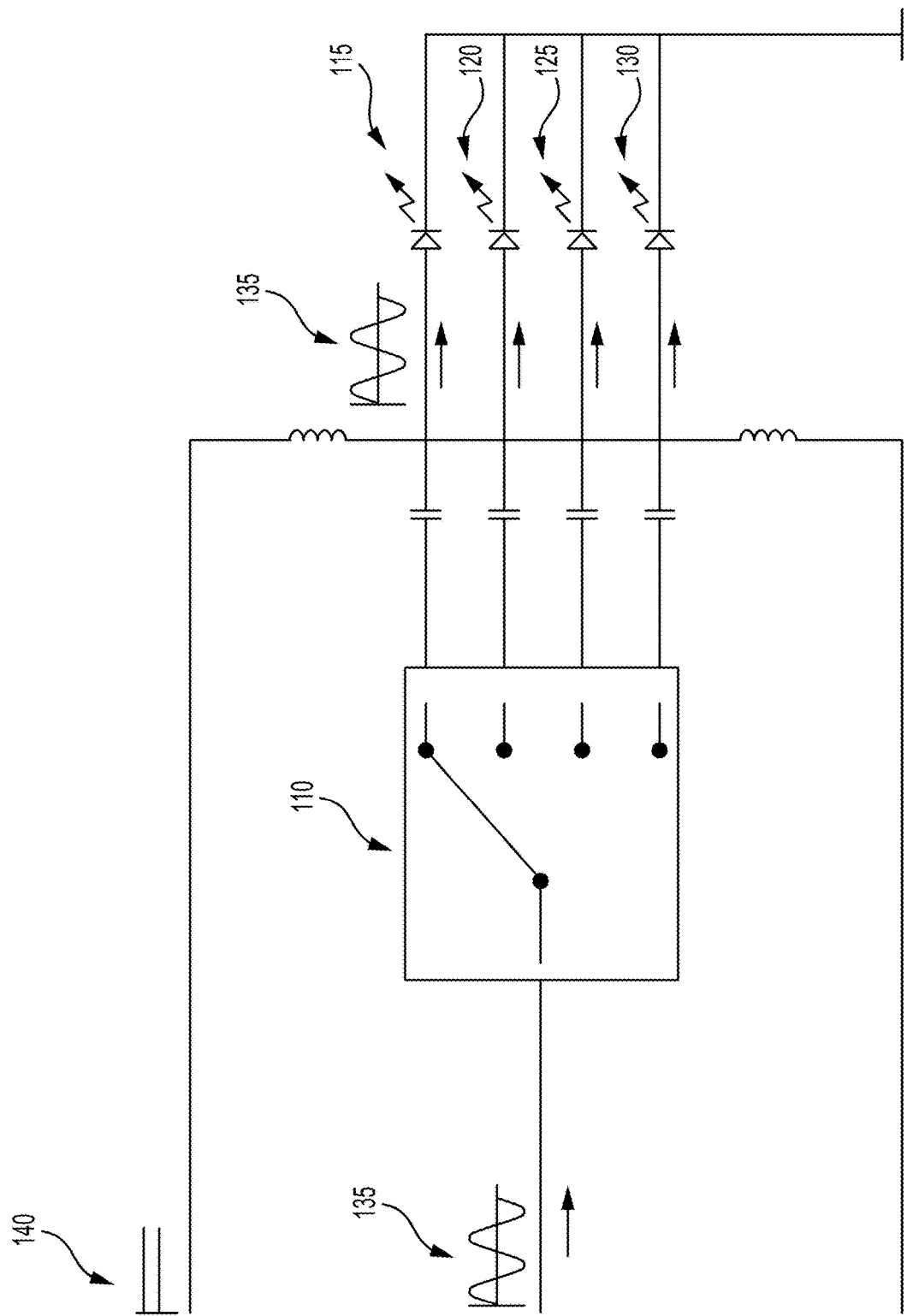
FIG. 5 is a circuit diagram of a radio frequency (RF) switch and a plurality of light sources of the system of FIG. 4.

As shown in FIG. 5, the RF generator 95 can produce a fixed RF frequency using an onboard voltage-controlled oscillator (VCO) which can be trimmed to any frequency in a range of about 150 MHz to about 200 MHz using a potentiometer. The output of the V C 0 is fed into a dual stage amplifier to amplify the signal about four times, or four times, resulting in an RF signal amplitude 135 going to the RF switch 110. In some non-limiting embodiments, the RF signal amplitude 135 can be on or about 1.6 Vpp (+8 dBm). The RF switch 110 can sequentially relay the RF signal amplitude 135 to each of the first light source 115, the second light source 120, the third light source 125, and the fourth light source 130 individually via a bias T network. The first light source 115, the second light source 120, the third light source 125, and the fourth light source 130 are also supplied with a DC bias current 140 concurrently with receiving the RF signal amplitude 135 for modulating all of the mentioned light sources. In a non-limiting embodiment, the DC bias current 140 can be on or about 30 mA.

Referring back to FIG. 4, the pulsing incident beams of functional near infrared light (IBNIR), which are generated by the transmitter 100 and are directed toward a portion of the patient's brain 45, can have both an incident amplitude, $A_I$, and an incident phase, $\phi_I$, associated therewith. In an embodiment, when the pulsing incident beams of functional near infrared light (IBNIR) are directed toward the RF-influenced brain tissue, pulsed incident NIR light photons can interact with modulated photons in the brain tissue, leading to altered scattering and absorption. Resultant backscattered beams of near infrared light (BSBNIR) can be received by the receiver 80, which can convert the received backscattered beams of near infrared light (BSBNIR) into a signal representative of a backscattered amplitude, $A_{BS}$, and a backscattered phase, $\phi_{BS}$. The signal from the backscattered beams of near infrared light (BSBNIR) can carry information about the brain tissue composition, scattering behavior of the NIR light photons, absorption behavior of the NIR light photons, and any brain abnormalities (i.e., brain damage, brain tumor, brain hemorrhage, ischemic stroke, and the like) that may be present.

In another non-limiting embodiment, the distance between the transmitter 100 and the receiver 80 can be set at on or about 1 cm, although it should be understood that the penetration depth may be increased by decreasing this distance. The transmitter 100 can be a pulsing multi-wavelength VCSEL, module No. V3WLM-002 manufactured by Vixar Inc. of Minnesota, as a non-limiting example. The receiver 80 can include a detector 145 and a photon counter 150. In a non-limiting embodiment, there can be a plurality of detectors 145. The detector 145 can be an avalanche photodiode (APD) detector, model No. C5658 manufactured by Hamamatsu© Photonics K.K. Corporation of Japan. The photon counter 150 can be model No. H8259-02 also manufactured by Hamamatsu® Photonics K.K. Corporation of Japan, as a non-limiting example.

Figure 6:
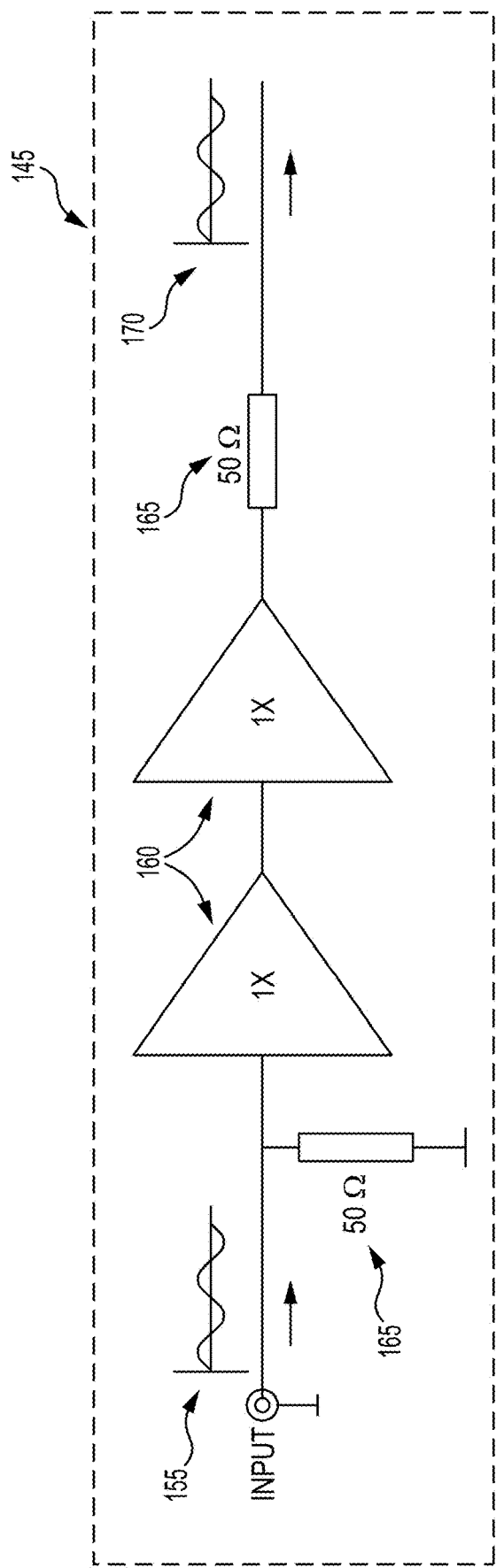
FIG. 6 is a circuit diagram of a detector of the system of FIG. 4.

As shown in FIG. 6, signals 155 of the backscattered beams of near infrared light (BSBNIR), which are optical signals, can be received by the detector 145 to be amplified by amplifiers 160 and then buffered with a 50Q input buffer 165 to maintain signal integrity, thereby generating buffered signals 170 of the backscattered beams of near infrared light (BSBNIR), which are electrical analog signals varying over time.

Figure 7:
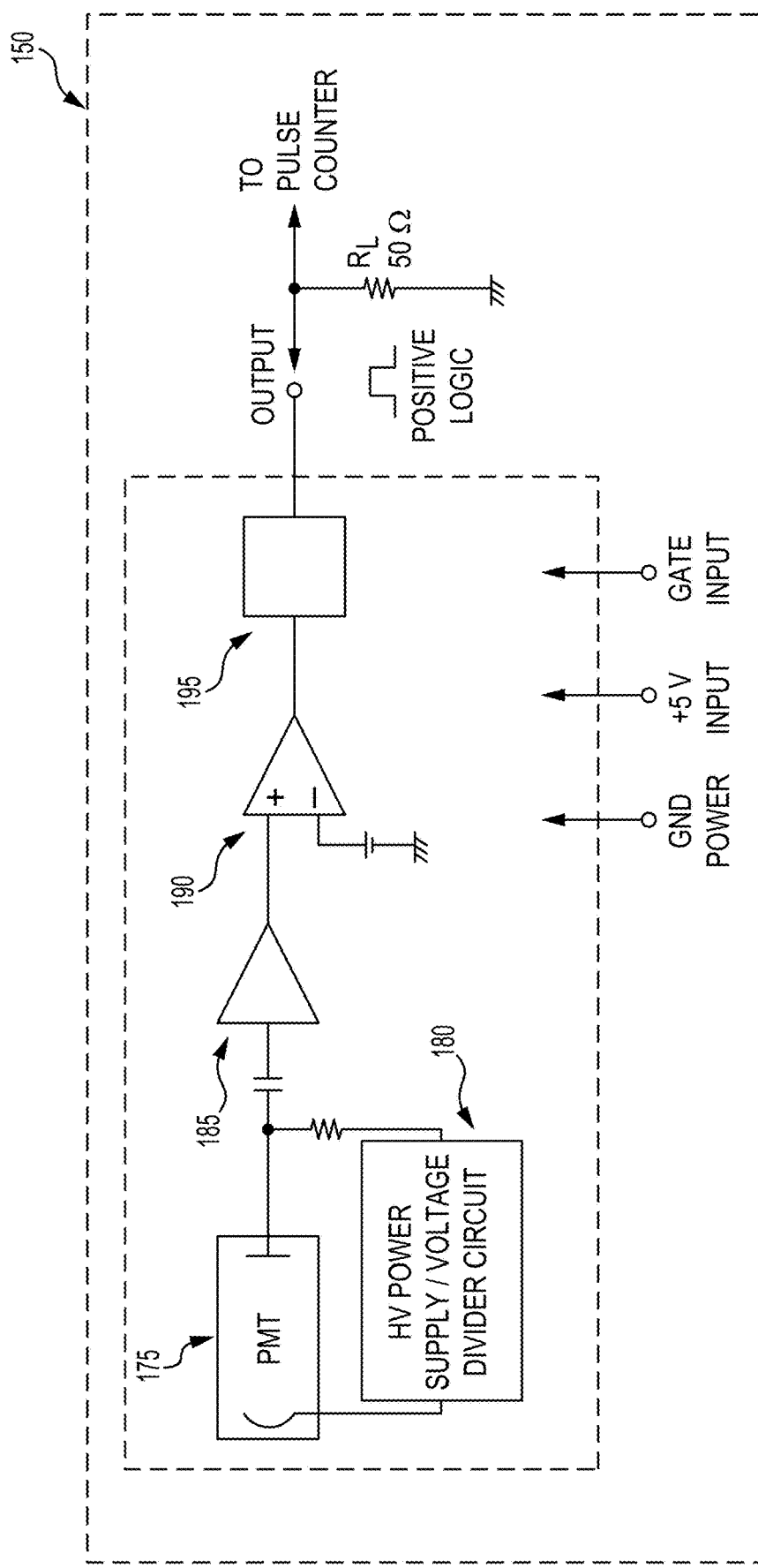
FIG. 7 is a circuit diagram of a photon counter of the system of FIG. 4.

FIG. 7 shows a block diagram of the photon counter 150 model No. H 8259-02. The photon counter 150 can be configured to measure the number of photons detected from the backscattered beams of near infrared light (BSBNIR) thereby providing data on brain tissue properties. The data on brain tissue properties can include the number of photons that are backscattered from various depths within the brain tissue. The data can also include the energy and timing at which the photons hit the brain tissue. The number of photons that are backscattered can be correlated with one or more of hemoglobin levels, oxygenation states, and brain tissue composition (i.e., healthy, hemorrhagic stroke, tumor, ischemic stroke). By measuring the number of photons from the BSBNIR, the system 10 can detect local optical and morphological light properties that can reveal potential brain abnormalities (i.e., brain damage, brain tumor, brain hemorrhage, ischemic stroke, and the like).

In an embodiment, by counting the number of photons (and optionally measuring their time-of-flight) from the backscattered near infrared light (BSBNIR), the photon counter 150 can generate quantitative data reflecting how the NIR light photons interact with different tissue layers. Specifically, the absorption and scattering characteristics of the photons can reveal, e.g., a tissue's hemoglobin levels, oxygenation states, and overall composition which are crucial indicators for distinguishing healthy brain tissue from hemorrhagic, tumor-affected, or ischemic regions. Through these measurements, the system 10 can infer the local vascular density and structural integrity of the brain, allowing it to identify potential abnormalities such as brain damage, brain tumors, brain hemorrhages, and ischemic strokes.

The photon counter 150 can include a photomultiplier tube (PMT) (175), a high voltage power supply/voltage divider circuit 180, an amplifier 185, a comparator 190, and a pulse shaper 195. To improve reliability of the measurements, a timing module within the photon counter 150 is synchronized with the first light source 115, the second light source 120, the third light source 125, and the fourth light source 130. This synchronization allows for time correlated photon counting by distinguishing between scattered photons and potential background noises. In a further non-limiting embodiment, the timing module is a time of flight (ToF) sensor module.

The backscattered amplitude ($A_{BS}$) and the backscattered phase ($N_{BS}$) of the backscattered beams of near infrared light (BSBNIR) can be measured by the comparator microchip 105 as time domain signals, allowing an insertion loss ($I_L$), an insertion phase difference ($I_{PD}$), and time-delay to be calculated by the controller 90 as shown in FIG. 4. The controller 90 may be any suitable controller, such as by way of non-limiting example a processor, a programmable logic controller (PLC), a microcontroller unit (MCU), or a field-programmable gate array (FPGA). The insertion loss ($I_L$), which is absorption of the near-infrared light as it interacts with the brain tissues, can be calculated as $$I_L = 20\log\frac{A_{BS}}{A_I}.$$

The insertion phase difference ($I_{PD}$), which is scattering of the near-infrared light as it interacts with the brain tissues, can be calculated as $I_{PD}=\phi_{BS}-\phi_I$. The calculated insertion loss ($I_L$) and insertion phase difference ($I_{PD}$) can contain information about the brain tissue composition and any brain abnormalities (i.e., brain damage, brain tumor, brain hemorrhage, ischemic stroke, and the like) received from the backscattered beams of near infrared light (BSBNIR) as mentioned previously.

Figure 8:
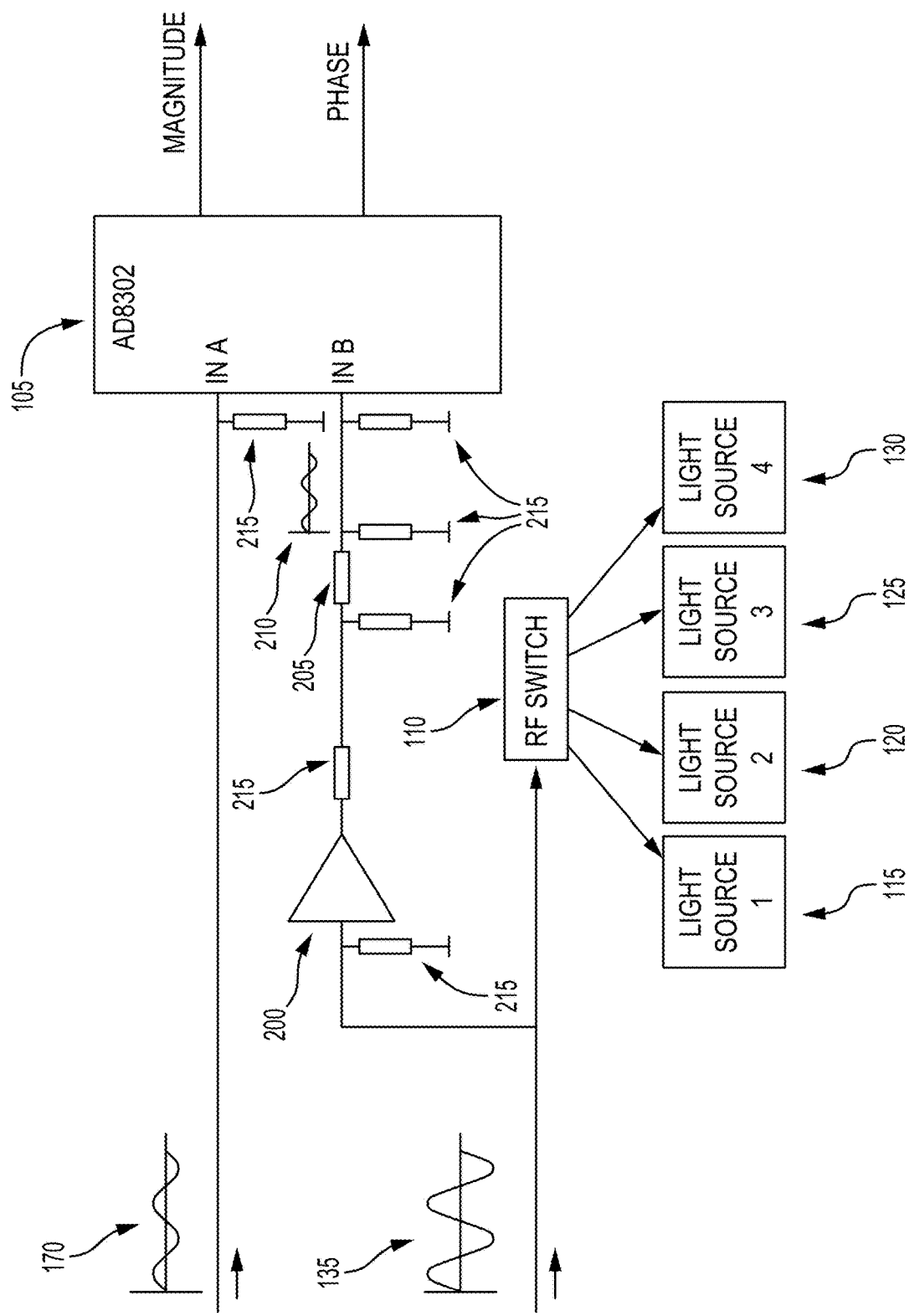
FIG. 8 is a circuit diagram showing how the signals from the detector and an RF generator are being processed by a comparator microchip of the system of FIG. 4.

As shown in FIG. 8, the buffered signals 170 of the backscattered beams of near infrared light (BSBNIR) from the detector 145 can be compared with the RF signal amplitude 135 from the RF generator 95 by sending the respective signals to the comparator microchip 105, which may be a magnitude and phase detector integrated circuit model No. AD8302 from Analog Devices, as a non-limiting example, for analyzing the difference in magnitude and phase. Specifically, a portion of the RF signal amplitude 135 can be sent to the RF switch 110 for modulating the first light source 115, the second light source 120, the third light source 125, and the fourth light source 130 as mentioned above. Another portion of the RF signal amplitude 135 can be sent to a buffer 200 and then to an attenuator 205 to generate an attenuated buffered RF signal amplitude 210 prior to being processed by the comparator microchip 105. The comparator microchip 105 can include a plurality of 50Ω resistors 215. As a result of processing the buffered signals 170 of the backscattered beams of near infrared light (BSBNIR) and the attenuated buffered RF signal amplitude 210, the comparator microchip 105 can generate two output analog voltages called magnitude (Tx) and phase (Rx) expressed in decibels (dB) as time-domain waveform signals. The two output analog voltages can be connected with an A/D converter of an Arduino controller, as a non-limiting example, for further processing.

Preprocessing

Figure 16:
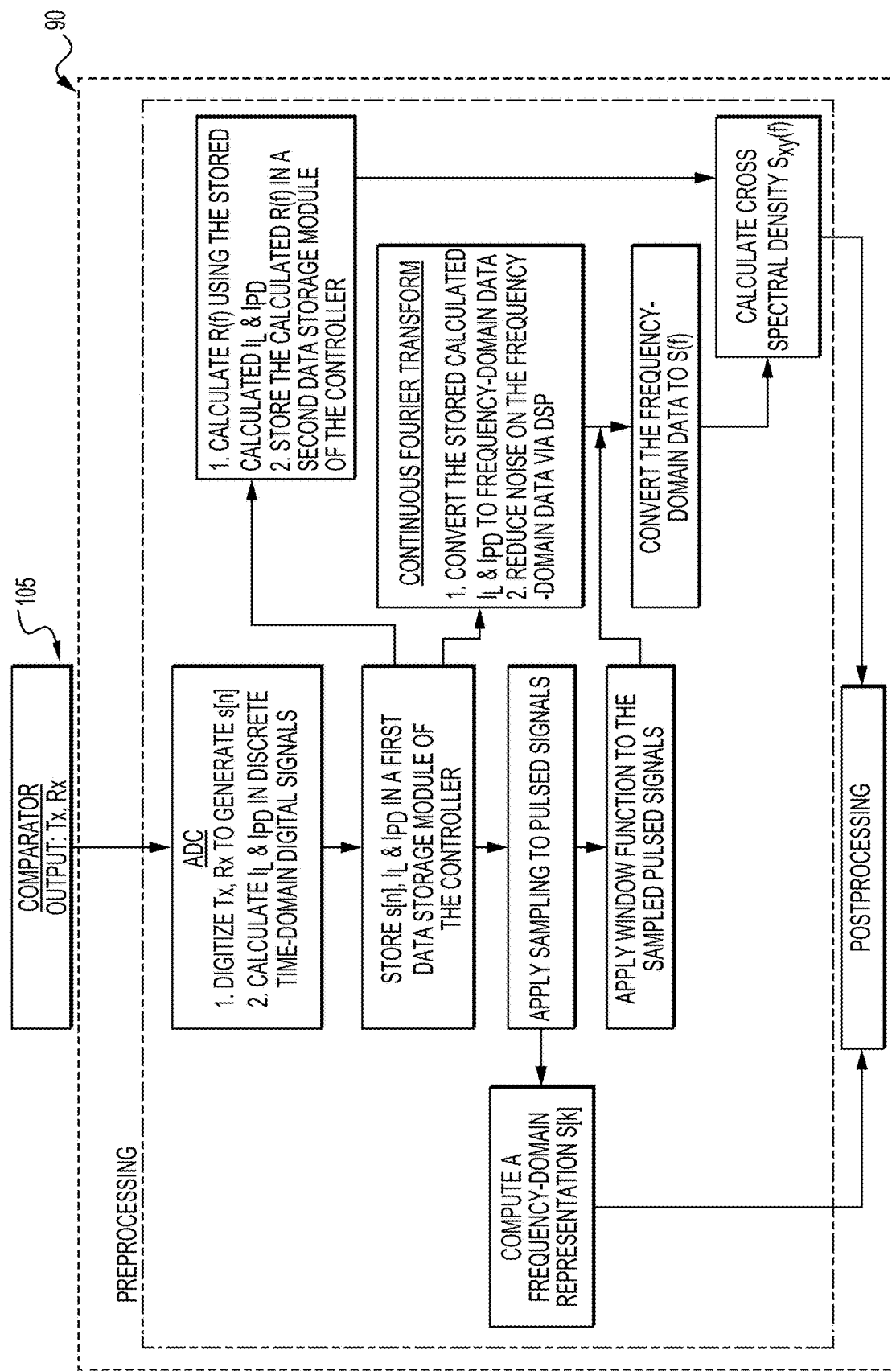
FIG. 16 is a flow diagram depicting preprocessing steps after two output analog voltages from a comparator microchip are generated.

At an initial stage of a preprocessing step, as shown in FIG. 16, the two output analog voltages, Tx and Rx, can be fed into an analog-to-digital converter (ADC) within the controller 90 to digitize Tx and Rx prior to the calculation of the insertion loss ($I_L$) and insertion phase difference ($I_{PD}$) as described herein. According to this embodiment, the ADC can sample the two output analog voltages, Tx and Rx, at fixed intervals to generate multiple discrete iterations of signal samples, s[n], which represent the backscattered NIR signals (intensity of the backscattered amplitude ($A_{BS}$) and the backscattered phase ($p_{BS}$) of the backscattered beams of near infrared light (BSBNIR)).

Then, as shown in FIG. 16, the insertion loss ($I_L$) and insertion phase difference ($I_{PD}$) can be calculated within the ADC multiple times based on the multiple discrete iterations of the signal samples, s[n], thereby generating discrete time-domain digital signals of the insertion loss ($I_L$) and insertion phase difference ($I_{PD}$). The generated s[n] and the calculated $I_L$ and $I_{PD}$ can be stored in a first data storage module of the controller 90 as depicted in FIG. 16.

The determination of whether or not the patient has a healthy brain or brain abnormalities (i.e., brain tumor, brain hemorrhage, ischemic stroke, etc.) can be based on the calculated discrete time-domain digital signals of the insertion loss ($I_L$), the calculated insertion phase difference ($I_{PD}$), or both.

In certain embodiments, it can be determined that the patient's brain 45 has a hemorrhage, which is a condition of elevated pooled blood and oxygenated hemoglobin due to damaged blood vessels and therefore absorbs higher NIR light, if the calculated insertion loss ($I_L$) is above a first loss threshold (first loss threshold is based on NIR imaging results from patient populations in clinical trials, represents typical absorption level of NIR light for brain hemorrhage condition) and/or the calculated insertion phase difference ($I_{PD}$) is lower (due to homogeneous low scattering level of NIR light caused by the pool blood) than a first phase threshold (first phase threshold is based on NIR imaging results from patient populations in clinical trials, represents typical scattering level of NIR light for brain hemorrhage condition).

In other embodiments, it can be determined that the patient's brain 45 has healthy brain tissues, which have less dense structure compared to brain tissues affected by hemorrhages and therefore absorb minimal NIR light, if the calculated insertion loss ($I_L$) is lower than a second loss threshold (second loss threshold is based on NIR imaging results from patient populations in clinical trials, represents typical absorption level of NIR light for normal brain tissues) and/or the calculated insertion phase difference ($I_{PD}$) is higher (due to the complex structure of the healthy cerebral cortex of the brain which leads to uniform scattering level of the NIR light) than a second phase threshold (second phase threshold is based on NIR imaging results from patient populations in clinical trials, represents typical scattering level of NIR light for normal brain tissues).

In additional embodiments, it can be determined that the patient's brain 45 has a tumor, which is a condition with irregular and heterogeneous composition within the brain tissues and therefore absorbs NIR light less than brain hemorrhage and more than heathy brain tissues, if the calculated insertion loss ($I_L$) is between the first and second loss thresholds and/or the calculated insertion phase difference ($I_{PD}$) is higher than the first and second phase thresholds.

In still other embodiments, it can be determined that the patient's brain 45 has an ischemic stroke, which is a condition that causes blood flow reduction and deoxygenated hemoglobin concentrations and therefore absorbs NIR light less than brain hemorrhage and more than heathy brain tissues, if the calculated insertion loss ($I_L$) is between the first and second loss thresholds and/or the calculated insertion phase difference ($I_{PD}$) is higher than the first and second phase thresholds but not as high as for the brain tumor.

In an embodiment, the stored calculated discrete time-domain digital signals of the insertion loss ($I_L$) and insertion phase difference ($I_{PD}$) can be used to calculate the pulsed RF signal-frequency domain, R(f), by the following equation:

$$R(f) = \int_{-\infty}^{\infty} r(t)e^{-j2\pi ft}dt \quad \text{(Eq. 7)}$$

wherein,
r(t) is the pulse of the R(f) with respect to time;
ft is the product of frequency variable (f) (Hz) and time variable (t) (sec);
j is an imaginary unit (j=−1); and
dt is integration with respect to time.

Eq. 7 decomposes the RF pulses into frequency components to analyze their spectral content and identify harmonics and sidebands that may result from the pulsing and modulation processes as mentioned above. Once the pulsed RF signal-frequency domain, R(f), is calculated, it can be stored in a second data storage module of the controller 90 as shown in FIG. 16. The stored pulsed RF signal and frequency domain, R(f), can be later used for calculating the cross-spectral analysis or cross-spectral density, $S_{xy}(f)$, as described herein.

Concurrently or consecutively with the calculation of R(f), the stored calculated discrete time-domain digital signals of the insertion loss ($I_L$) and insertion phase difference ($I_{PD}$) can be converted to frequency-domain using a continuous Fourier transform (i.e., fast Fourier transform (FFT)) via the controller 90 to generate frequency-domain data for highlighting specific frequency components (i.e., dominant frequencies). By analyzing the frequency-domain data, identification and isolation of particular frequency components (i.e., identify which frequencies are present in the discrete time-domain digital signals associated with physiological signals (i.e., legitimate low-frequency bodily rhythms such as heartbeat, breathing, slow vascular changes) or artifacts (i.e., unwanted signals such as muscle noise, ambient light, or instrumentation interference) and their amplitudes after the Fourier transform decomposes the discrete time-domain digital signals into constituent frequencies) can be achieved which can enhance diagnostic capabilities by focusing on relevant signal features (i.e., relevant signal features are dominant frequencies and bandwidth after filtering out unwanted constituent frequencies). This can improve classification by AI algorithms as described herein. Additionally, the analyzing step of the frequency-domain data can simultaneously reduce noise more effectively and can extract features (i.e., meaningful patterns or relationships in the signal's spectral representation (whether it's a new peak, a shift in bandwidth, or a signature frequency) that were not easily visible in the raw time-domain digital signals). The noise reduction can be done by digital signal processing (DSP) which can include a noise filtering component filtering algorithms (i.e., low-pass, high-pass, band-pass) within the continuous Fourier transform. By isolating or filtering these specific spectral components, the system 10 can, by way of non-limiting example, more accurately characterize brain tissue states, remove extraneous noise (i.e., filter out unwanted constituent frequencies), and help AI algorithms achieve better classification of brain abnormalities as described herein.

To accurately capture and analyze the frequency content of the pulsed signals (i.e., IBNIR signals), sampling and windowing can be performed as depicted in FIG. 16. Corresponding to this embodiment, sampling (i.e., $s[n]_0$, $s[n]_1$, $s[n]_2$, $s[n]_3$, etc. of the mentioned s[n] stored in the first data storage module) of the pulsed signals can be conducted at a discrete rate that meets or exceeds a Nyquist criterion, thereby ensuring the sample rate is at least twice the highest frequency present in the pulsed signals, typically in the range of about 30 MHz to about 1000 MHz. By adhering to this sampling rate, the system 10 can prevent aliasing (i.e., misinterpretation of higher-frequency components as lower-frequency signals) and can secure a high-fidelity digital representation essential for Fourier transform computations and subsequent AI-based classification as described herein. The sampling step can be done simultaneously or consecutively with the calculation of the R(f) and the steps of conversion and noise reduction of the frequency-domain data as shown in FIG. 16.

Next, a window function (i.e., Hamming, Hanning, or Blackman, etc.) can be applied to each of the sampled pulsed signals (i.e., $s[n]_0$, $s[n]_1$, $s[n]_2$, $s[n]_3$, etc.), thereby smoothing signal edges and minimizing spectral leakage. Afterward, the window function sampled pulsed signals can be applied to the noise reduced frequency-domain data to refine the noise reduced frequency-domain data by reducing artificial energy spillover into adjacent bins, thereby enhancing the clarity of legitimate spectral peaks. By combining the sampling with the appropriate windowing function, a robust signal processing chain that reliably reflects the underlying RF-IBNIR physical interactions can be achieved and additionally can provide high-quality data for advanced spectral analysis and AI-driven diagnostic outcomes.

The noise reduced frequency-domain data, which has been window functioned, can be converted (or calculated) to a frequency spectrum, S(f), by the following equation:

$$S(f) = \int_{-\infty}^{\infty} s(t)e^{-j2\pi ft}dt \quad \text{(Eq. 8)}$$

wherein,
s(t) is time-domain signal (i.e., amplitude or phase of the NIR discrete time-domain digital signals);
ft is the product of frequency variable (f) (Hz) and time variable (t) (sec);
j is an imaginary unit (j=−1); and
dt is integration with respect to time.

The frequency spectrum, S(f), describes a continuous Fourier transform of a signal s(t) defined as the backscattered pulse signal where the pulsed IBNIR signals are decomposed to analyze frequency components affected by tissue interaction and identify changes in the amplitude and phase of specific frequency components associated with different tissue types or brain abnormalities.

By converting the discrete time-domain digital signals of the insertion loss ($I_L$) and the insertion phase difference ($I_{PD}$) into the noise reduced frequency-domain data, cross-spectral analysis (i.e., filtering for noise reduction or identifying dominant frequency peaks) can be enabled, thereby improving feature extraction for downstream AI classification as described herein. Additionally, because both the RF signal and NIR backscattered signal are now in the frequency-domain, the cross-spectral analysis (also known as cross-spectral density) can be performed to examine how RF modulation affects the NIR signals, further refining diagnostic insights.

The cross-spectral analysis or cross-spectral density, $S_{xy}$(f), has the following equation:

$$S_{xy}(f) = S(f) * R(f) \quad \text{(Eq. 9)}$$

wherein,
S(f) corresponds to Eq. 8; and
R(f) corresponds to Eq. 7.

The calculation of the R(f), S(f), and $S_{xy}$(f) can occur within the controller (90). In an embodiment, the calculated cross-spectral density, $S_{xy}$(f), can be input into the AI algorithms within the postprocessing steps generating diagnostic information relating to potential brain abnormalities as described herein.

Concurrently or consecutively with the step of applying the window function, a discrete Fourier transform (DFT) can be employed to each of the sampled pulsed signals (i.e., $s[n]_0$, $s[n]_1$, $s[n]_2$, etc.) to compute a frequency-domain representation. By sampling the analog signals (i.e., buffered signals 170) at a sufficient rate (adhering to the Nyquist criterion), the system 10 can preserve the pertinent frequency content thereby storing each sample as a discrete time-domain value s[n]. This can yield a finite sequence of samples suitable for the DFT, which can produce a set of frequency "bins" reflecting signal energy or phase at discrete frequencies. The DFT can be efficiently computed by implementing a fast Fourier transform (FFT).

The mentioned frequency-domain representation, S[k], can be represented by the following equation:

$$S[k] = \sum_{n=0}^{n-1} s[n]e^{-j\frac{2\pi}{N}nk} \quad \text{(Eq. 10)}$$

wherein,
S[k] is the frequency-domain representation at frequency bin k;
s[n] is the discrete time-domain signal samples (i.e., backscattered NIR signals);
N is the total number of samples;
n is the sample index in time domain; and
k is the sample index in frequency domain.

The calculated frequency-domain representation, S[k], can be fed into the AI algorithms within the postprocessing steps as described herein.

Figure 2:
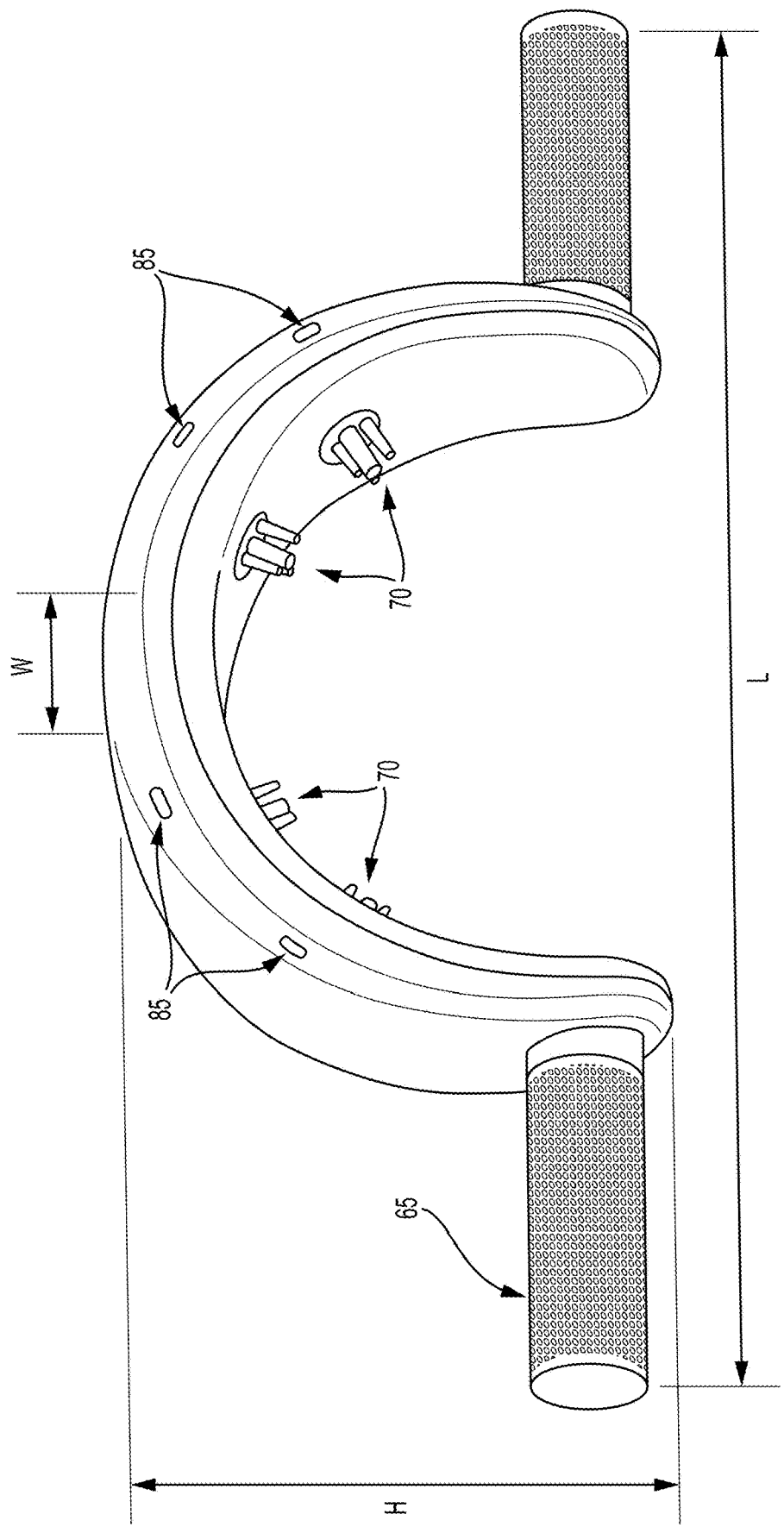
FIG. 2 is a front view in section of the system of FIG. 1.
Figure 3:
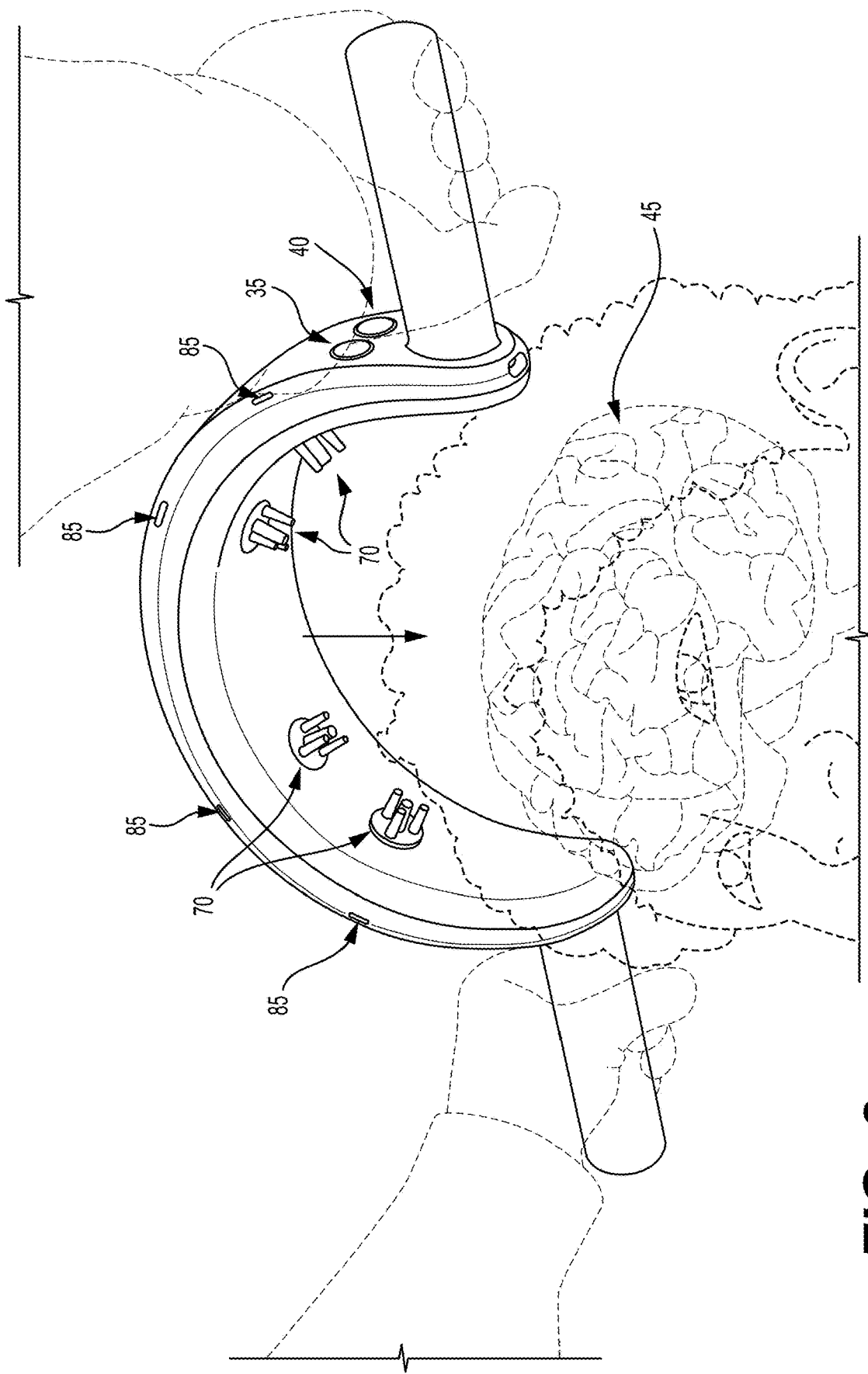
FIG. 3 is a front view in section of the system of FIG. 1, shown being placed on a patient's head.

As a non-limiting example, a machine learning system, which can be within the controller 90, can be trained with the first loss threshold, the second loss threshold, the first phase threshold, and the second phase threshold. This machine learning system can be used to compare the calculated insertion loss ($I_L$) and insertion phase difference ($I_{PD}$) against the training data. Based on determination of the type of brain condition (i.e., healthy brain, brain damage, brain tumor, brain hemorrhage, brain ischemic stroke, etc.) from the comparison, the controller 90 can activate the respective LED color (i.e., green, red, orange, yellow, or purple) from the plurality of LED light indicators 85 as shown in FIGS. 1-3. It should be understood that any suitable hardware and/or software may be used for performing the determination.

As non-limiting examples, supervised learning and/or unsupervised learning techniques may be used, either alone or in combination with deep learning algorithms, allowing for effective analysis of the signals obtained from the patient's brain. The use of machine learning allows for fine tuning and optimization to improve the accuracy, sensitivity, and specificity of the system, resulting in not only automated detection of brain abnormalities, but also reducing the risk of human error. It should also be understood that while the comparison can be completed with a machine learning system as described herein, other systems such as Monte Carlo simulations and fuzzy logic can be used without departing from the present subject matter.

In one embodiment, the method of detecting brain abnormalities using backscattered NIR light for determining a healthy brain, brain damage, brain tumor, brain hemorrhage, brain ischemic stroke, and the like can start with the user placing the headband on the patient's head to permit interaction with the user's brain 45 as shown in FIG. 3. According to this embodiment, the placement of the headband 15 can initially be on the healthy side of the patient's brain 45. The user then presses the calibration button 35 on the headband 15, which actives the blue LED from the plurality of LED light indicators 85, to initiate a scan of the healthy side of the patient's brain 45 to establish a baseline thereby calibrating the system 10 by capturing the optical properties of the brain tissues that are considered normal for the patient. In certain embodiments, the baseline can serve as a predefined threshold for comparing with subsequent insertion loss ($I_L$) and insertion phase difference ($I_{PD}$) readings thereby enabling determination of the type of brain abnormalities as described herein. Once the threshold is established according to this embodiment, the user can reposition the headband 15 to correspond to the symptomatic region of the patient's brain 45 where the brain abnormalities may occur. Then, the user can press the reset button 40 to initiate diagnostic scanning of the patient's brain for detecting brain abnormalities.

As shown in FIGS. 4-5, once the reset button 40 is pressed, the process for performing detecting brain abnormalities can begin with the controller 90 sending a signal to the RF generator 95 to generate the RF signal amplitude 135 to be sent to the RF switch 110 for modulating the first light source 115 (Step 1). Concurrently, the controller 90 can initiate the DC bias current 140 to be sent to the first light source 115 to generate a pulsing incident beam of functional near infrared light (IBNIR) at a wavelength of about 650 nm to about 680 nm (Step 2). The pulsing incident beam of functional near infrared light (IBNIR) from the first light source 115 can be directed toward the symptomatic region of the patient's brain 45 (Step 2). Then, a backscattered beam of near infrared light (BSBNIR) coming from the patient's brain 45 can be detected by the detector 145 and the photon counter 150 as shown in FIGS. 4 and 6-7 (Step 3). Signal 155 of the backscattered beam of near infrared light (BSBNIR) can be amplified and buffered by the detector 145 to generate buffered signal 170 of the backscattered beam of near infrared light (BSBNIR) as shown in FIG. 6 (Step 4).

Next, the buffered signal 170 of the backscattered beam of near infrared light (BSBNIR) from the detector 145 can be compared with the RF signal amplitude 135 from the RF generator 95 by sending the respective signals to the comparator microchip 105 to generate output analog voltage readings in terms of magnitude (Tx) and phase (Rx) as shown in FIGS. 4 and 8 (Step 5). Afterward, the magnitude and phase readings can be sent to the ADC of the controller 90 to generate multiple discrete iterations of signal samples, s[n], and then calculating discrete time-domain digital signals of the insertion loss ($I_L$) and insertion phase difference ($I_{PD}$) based on the s[n](Step 6). Thereafter, the generated s[n] and the calculated insertion loss ($I_L$) and the insertion phase difference ($I_{PD}$) can be stored in a first data storage module within the controller 90 (Step 7). Subsequently, steps 1-7 can be repeated for the second light source 120, the third light source 125, and the fourth light source 130 at the respective wavelengths of about 760 nm, about 850 nm, and about 980 nm (Step 8).

Once all the insertion loss ($I_L$) and the insertion phase difference ($I_{PD}$) data are calculated for all the light sources, those data can be compared with the training data (i.e., the first loss threshold, the second loss threshold, the first phase threshold, and the second phase threshold) from the machine learning system as described herein. Based on the determination of the type of brain condition (i.e., healthy brain, brain damage, brain tumor, brain hemorrhage, brain ischemic stroke, and the like) from the comparison, the controller 90 can activate the respective LED color (i.e., green, red, orange, yellow, or purple) from the plurality of LED light indicators 85 as shown in FIGS. 1-3.

After step 8 and referring back to FIG. 16, the preprocessing steps can continue. In this regard, the stored calculated discrete time-domain digital signals of the insertion loss ($I_L$) and insertion phase difference ($I_{PD}$) can be used to calculate the pulsed RF signal-frequency domain, R(f), using Eq. 7. The calculated pulsed RF signal and frequency domain, (R(f), can be stored in the second data storage module of the controller 90 as shown in FIG. 16.

Concurrently or consecutively with the calculation of R(f), the stored calculated discrete time-domain digital signals of the insertion loss ($I_L$) and insertion phase difference ($I_{PD}$) can be used to generate the frequency-domain data via the continuous Fourier transform. Noise reduction can be conducted on the frequency-domain data via the DSP with the continuous Fourier transform.

Simultaneously or consecutively with the calculation of the R(f) and the steps of conversion and noise reduction of the frequency-domain data, sampling of the pulsed signals (i.e., $s[n]_0$, $s[n]_1$, $s[n]_2$, $s[n]_3$, etc.) can be performed.

Next, a window function (i.e., Hamming, Hanning, or Blackman) can be applied to each of the sampled pulsed signals (i.e., $s[n]_0$, $s[n]_1$, $s[n]_2$, $s[n]_3$, etc.), thereby smoothing signal edges and minimizing spectral leakage.

Afterward, the window function sampled pulsed signals can be applied to the noise reduced frequency-domain data to enhance the clarity of legitimate spectral peaks. Thereafter, the noise reduced frequency-domain data, which has been window functioned, can be converted (or calculated) to S(f) using Eq. 8. Calibration constants ($\alpha$ and $\beta$), which originated from s(t) of Eq. 2, can be applied to the NIR discrete time-domain digital signals as indicated in Eq. 8. The calibration step can ensure accurate and reliable measurements of the two analog voltages, including setting a baseline for normal brain tissue.

Subsequently, the cross-spectral analysis or cross-spectral density, $S_{xy}(f)$, can be calculated by multiplying the S(f) by the R(f) as indicated in Eq. 9. The calculated cross-spectral density, $S_{xy}(f)$, can be used for identifying frequency patterns associated with different brain conditions. The calculated cross-spectral density, $S_{xy}(f)$, can be fed into the postprocessing steps as described herein.

Concurrently or consecutively with the step of applying the window function, a discrete Fourier transform (DFT) can be employed to each of the sampled pulsed signals (i.e., $s[n]_0$, $s[n]_1$, $s[n]_2$, etc.) to compute the frequency-domain representation, S[k], using Eq. 10. The calculated frequency-domain representation, S[k], can be fed into the AI algorithms within the postprocessing steps as described herein.

Postprocessing

Figure 17:
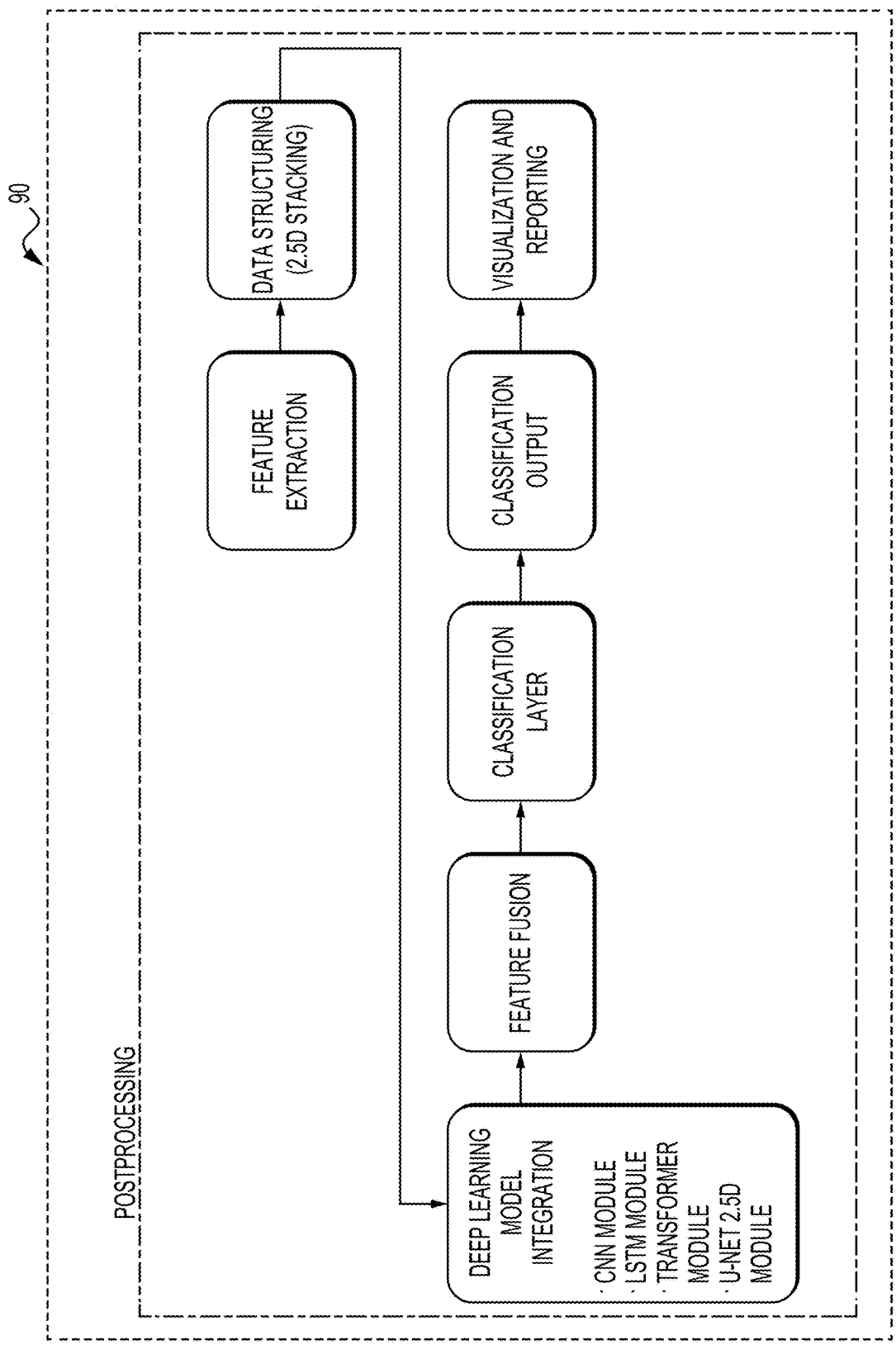
FIG. 17 is a flow diagram depicting postprocessing steps after the preprocessing steps.

Following, the postprocessing steps can occur as shown in FIG. 17. In this regard, the calculated cross-spectral density $S_{xy}(f)$ and the frequency-domain representation S[k] can be combined to obtain combined data in a feature extraction step as shown in FIG. 17. Next, statistical methods can be performed on the combined data to select the most relevant features.

Upon completion of the statistical methods, feature vectors can be prepared for model (i.e., the feature extraction) input into a data structuring as shown in FIG. 17. In a non-limiting embodiment, the data structuring can be 2.5 stacking. According to this embodiment, spatial measurements or consecutive time points can be stacked to create multi-channel 2D data that incorporates contextual information from neighboring points without the computational complexity of full 3D data to capture inter-slice or inter-measurement dependencies thereby enhancing the model's ability to detect subtle anomalies. Afterward, temporal measurements can be applied to the multi-channel 2D arrays (i.e., measurement data such as signals captured from different receiver 80 positions of the plurality of elements 70 as shown in FIG. 1) to capture change over time, thereby obtaining temporal multi-channel 2D.

The temporal multi-channel 2D can be input into AI models. In an embodiment, the AI models can be deep learning model integrations as shown in FIG. 17. The deep learning model integrations is a subset of machine learning. By way of non-limiting example, the deep learning model integrations can be selected from the group consisting of convolutional neural networks (CNN), long short-term memory (LSTM), transformer module, U-Net 2.5D module, and a combination thereof. In an embodiment, the deep learning model integrations can compare the calculated insertion loss ($I_L$) and insertion phase difference ($I_{PD}$) against the training data to classify potential brain abnormalities.

In an embodiment, the temporal multi-channel 2D (which contains the $S_{xy}(f)$ data and the $S[k]$ data) can be input into the convolutional neural networks (CNN) to extract local spatial features data from the discrete time-domain digital signals of the insertion loss ($I_L$) and insertion phase difference ($I_{PD}$) before patch embedding thereby enhancing the ability of the deep learning model to recognize fine-grained patterns in the backscattered near infrared (NIR) data. The CNN can perform the extraction using the following equation:

$$F_{CNN} = \text{ReLU}(W_{conv} * X + b_{conv}) \quad \text{(Eq. 11)}$$

wherein;
$F_{CNN}$ is the feature map output;
$W_{conv}$ are the convolutional weights;
X is the input data ($I_L$ and $I_{PD}$ data);
$b_{conv}$ is the bias term;
is the convolution operation; and
ReLU is the rectified linear unit activation function.

Thereafter, the extracted local spatial features data can be sequentially fed into LSTM layers for capturing temporal dependencies in sequential data, resulting in detection of dynamic changes in the brain activity.

The temporal dependencies can be combined with a transformer module to capture global context data and long-range dependencies data in the backscattered near infrared (NIR) data. The transformer module can also include implementing self-attention mechanisms to weigh the importance of different features and using positional encoding to retain sequence information.

The global context data and long-range dependencies data can be fed into an encoder-decoder architecture with skip connections within the U-Net 2.5D module whereby the data are segmented to localize potential abnormalities and preserve spatial resolution during upsampling.

Subsequently, concatenate features of the convolutional neural networks (CNN), long short-term memory (LSTM), transformer module, and U-Net 2.5D module can be performed in a feature fusion step and a classification layer step as shown in FIG. 17. Thereafter, fully connected layers (i.e., classification layers) can be used to integrate extraction features. Subsequently, Softmax function can be applied to output probabilities for each class. In this regard, the brain conditions (i.e., hemorrhage, tumor, ischemic stroke, healthy brain tissues) are classified at the classification layers with the application of the Softmax function. Immediately thereafter, the steps of determining and activating the respective LED color from the plurality of LED light indicators 85 can be performed.

Following, classification output can be performed on the classification data, which has been applied with Softmax function, to generate predicted class and confidence scores including providing probabilities for all classes to provide certainty in the results. The results can be stored for visualization and further analysis.

Next, in visualization and reporting steps, user graphical interfaces can be generated, and the results can be displayed. Also, probability maps highlighting affected areas of the brain can be displayed. In an embodiment, the system can be integrated into clinical workflows and provide alerts or recommendations based on classification. The system can support quick decision-making during examinations.

Figure 9:
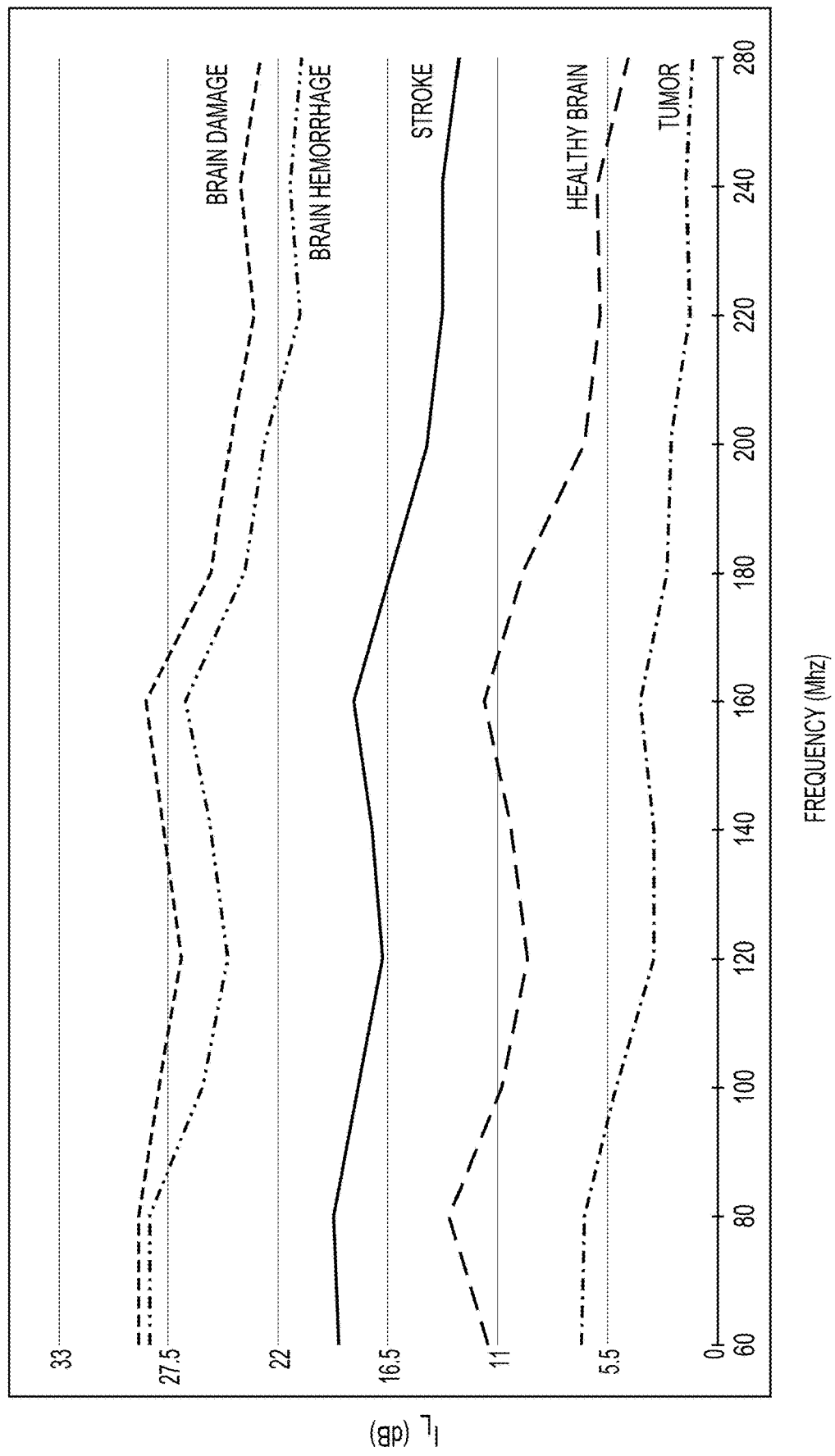
FIG. 9 is a graph comparing insertion loss results for the method of detecting brain abnormalities using backscattered light for cases including a healthy brain, brain damage, brain tumor, brain hemorrhage, and brain ischemic stroke.
Figure 10:
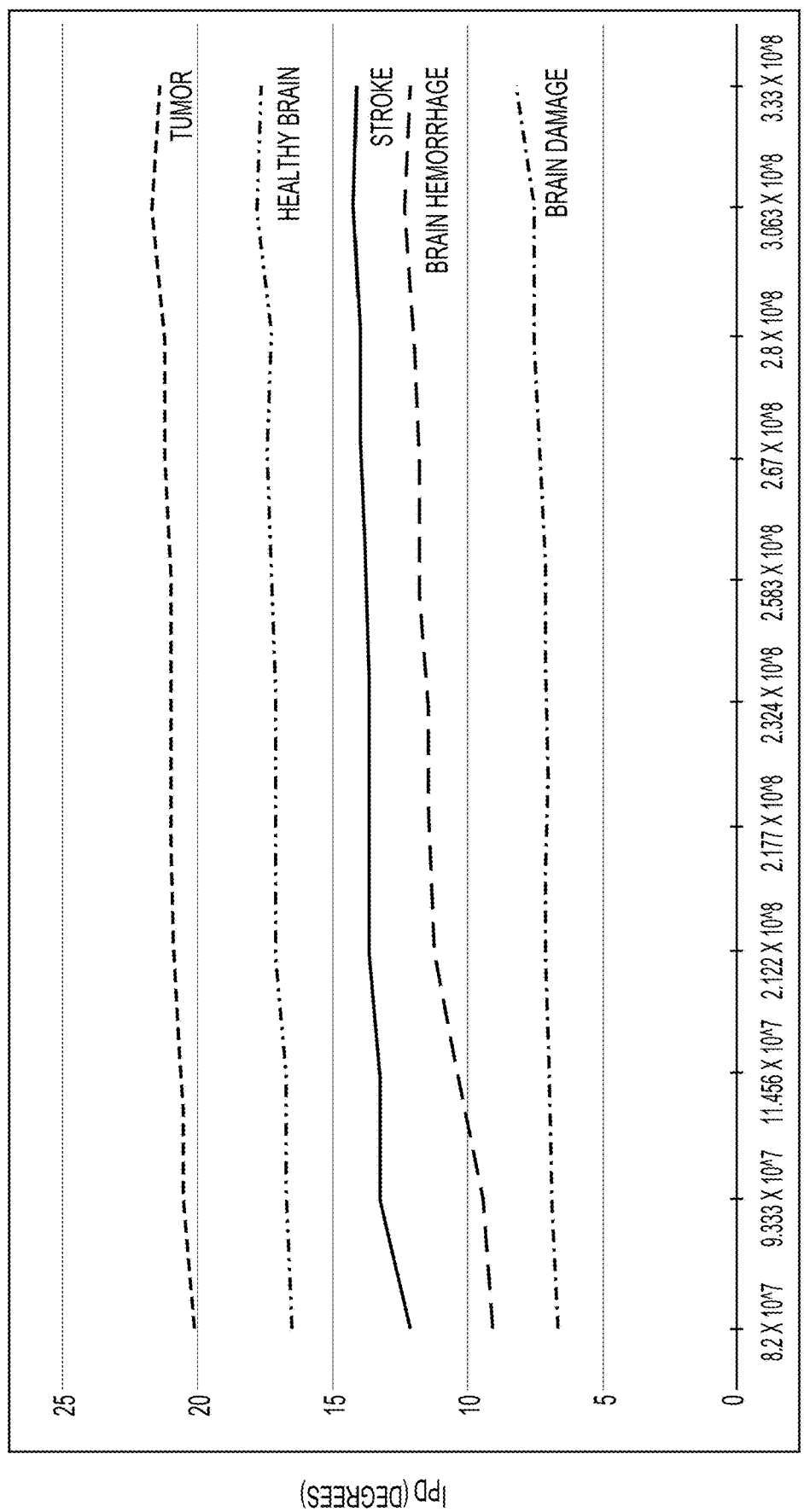
FIG. 10 is a graph comparing insertion phase difference results for the method of detecting brain abnormalities using backscattered light for cases including a healthy brain, brain damage, brain tumor, brain hemorrhage, and brain ischemic stroke.
Figure 11:
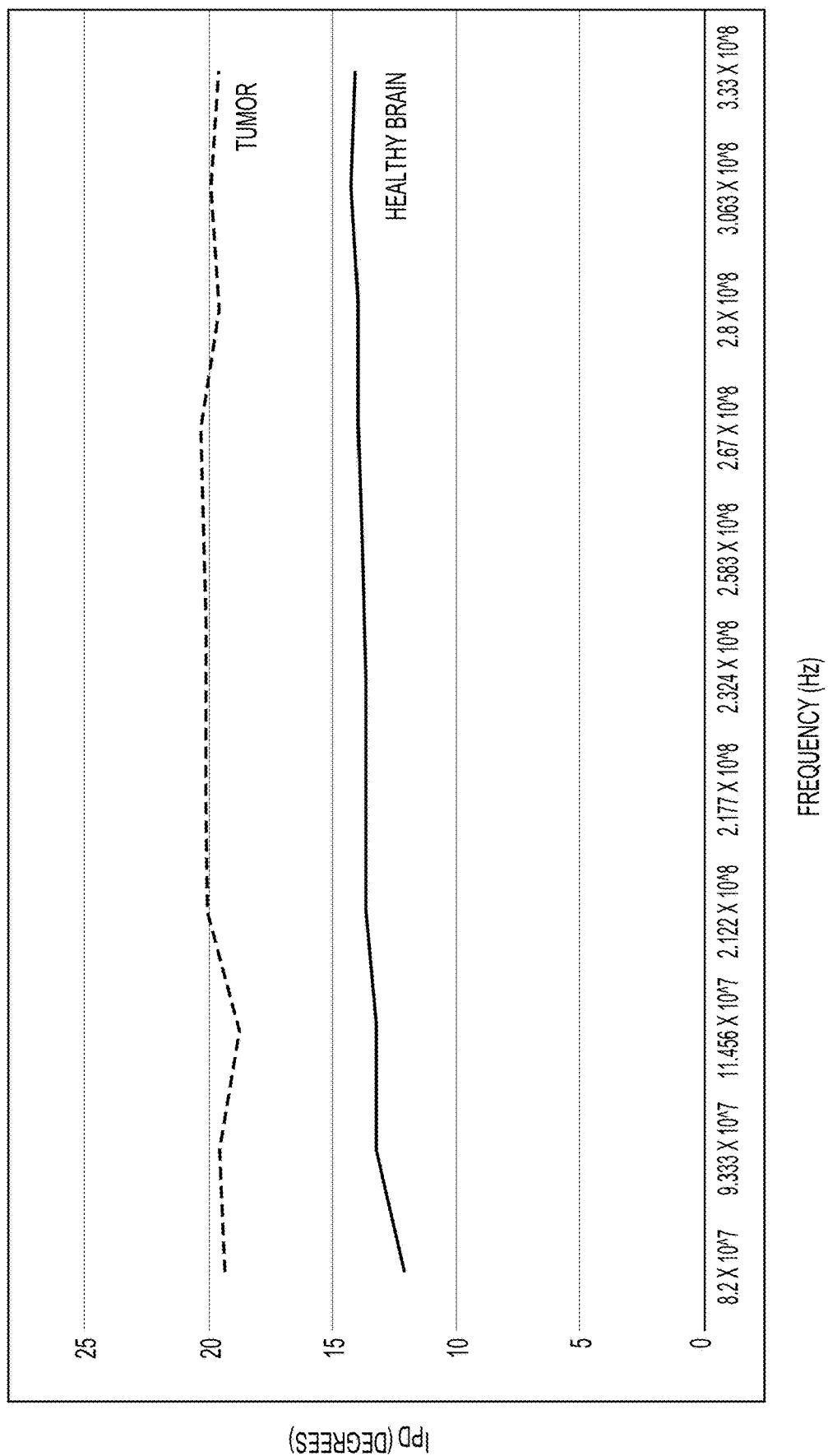
FIG. 11 is a graph comparing insertion phase difference results for the method of detecting brain abnormalities using backscattered light for cases including a healthy brain and a brain tumor.

FIGS. 9-12 depict the insertion loss ($I_L$) and the insertion phase difference ($I_{PD}$) for the detected brain abnormalities over a frequency range. As shown in FIG. 9, brain damage has the highest insertion loss ($I_L$) across the entire frequency range. On the other hand, brain tumors (measured with India ink) have the lowest insertion loss ($I_L$) across the entire frequency range. As shown in FIG. 10, brain tumors have the highest insertion phase difference ($I_{PD}$) across the entire frequency range. Conversely, brain damage (measured with India ink) has the lowest insertion phase difference ($I_{PD}$) across the entire frequency range. FIG. 11 shows that brain tumors have the highest insertion phase difference ($I_{PD}$) across the entire frequency range. Conversely, a healthy brain (measured with no India ink) has the lowest insertion phase difference ($I_{PD}$) across the entire frequency range. The India ink as described herein was used to simulate human blood. Corresponding data are shown in Tables 2-4, respectively showing the data for insertion loss (Id and insertion phase difference ($I_{PD}$).

TABLE 2

Insertion Loss Data (in dB)

| Frequency (MHz) | Healthy Brain | Tumor | Stroke | Brain Hemorrhage | Brain Damage |
|---|---|---|---|---|---|
| 60 | 11.44 | 6.78 | 18.98 | 28.44 | 28.95 |
| 80 | 13.43 | 6.70 | 19.23 | 28.43 | 28.98 |
| 100 | 10.81 | 5.07 | 17.90 | 25.81 | 27.99 |
| 120 | 9.51 | 3.23 | 16.78 | 24.51 | 26.85 |
| 140 | 10.34 | 3.20 | 17.30 | 25.34 | 27.72 |
| 160 | 11.63 | 3.90 | 18.22 | 26.63 | 28.63 |
| 180 | 9.73 | 2.52 | 16.38 | 23.73 | 25.33 |
| 200 | 6.68 | 2.33 | 14.48 | 22.68 | 24.44 |
| 220 | 5.90 | 1.39 | 13.79 | 20.90 | 23.23 |
| 240 | 6.00 | 1.55 | 13.72 | 21.42 | 23.90 |
| 280 | 4.50 | 1.32 | 12.99 | 20.80 | 22.89 |

TABLE 3

Insertion Phase Difference Phase (in degrees)

| Frequency (Hz) | Brain Damage | Brain Hemorrhage | Stroke | Healthy Brain | Tumor |
|---|---|---|---|---|---|
| $8.2 \times 10^7$ | 6.67 | 9.10 | 12.13 | 16.51 | 20.12 |
| $9.333 \times 10^7$ | 6.86 | 9.44 | 13.23 | 16.69 | 20.53 |

TABLE 3-continued

Insertion Phase Difference Phase (in degrees)

| Frequency (Hz) | Brain Damage | Brain Hemorrhage | Stroke | Healthy Brain | Tumor |
|---|---|---|---|---|---|
| $11.456 \times 10^7$ | 6.95 | 10.32 | 13.24 | 16.74 | 20.60 |
| $2.122 \times 10^8$ | 7.10 | 11.22 | 13.63 | 17.12 | 20.92 |
| $2.177 \times 10^8$ | 7.05 | 11.42 | 13.64 | 17.06 | 20.99 |
| $2.324 \times 10^8$ | 7.08 | 11.52 | 13.68 | 17.07 | 20.99 |
| $2.583 \times 10^8$ | 7.13 | 11.77 | 13.78 | 17.27 | 21.02 |
| $2.67 \times 10^8$ | 7.30 | 11.85 | 13.96 | 17.43 | 21.20 |
| $2.8 \times 10^8$ | 7.50 | 11.99 | 13.99 | 17.31 | 21.27 |
| $3.063 \times 10^8$ | 7.56 | 12.23 | 14.23 | 17.78 | 21.71 |
| $3.33 \times 10^8$ | 8.13 | 12.15 | 14.07 | 17.65 | 21.43 |

TABLE 4

Insertion Phase Difference Phase (in degrees)

| Frequency (Hz) | Healthy Brain | Tumor |
|---|---|---|
| $8.2 \times 10^7$ | 12.13 | 19.33 |
| $9.333 \times 10^7$ | 13.23 | 19.56 |
| $11.456 \times 10^7$ | 13.24 | 18.73 |
| $2.122 \times 10^8$ | 13.63 | 20.04 |
| $2.177 \times 10^8$ | 13.64 | 20.16 |
| $2.324 \times 10^8$ | 13.68 | 20.08 |
| $2.583 \times 10^8$ | 13.78 | 20.23 |
| $2.67 \times 10^8$ | 13.96 | 20.33 |
| $2.8 \times 10^8$ | 13.99 | 19.59 |
| $3.063 \times 10^8$ | 14.23 | 19.93 |
| $3.33 \times 10^8$ | 14.07 | 19.66 |

Figure 12:
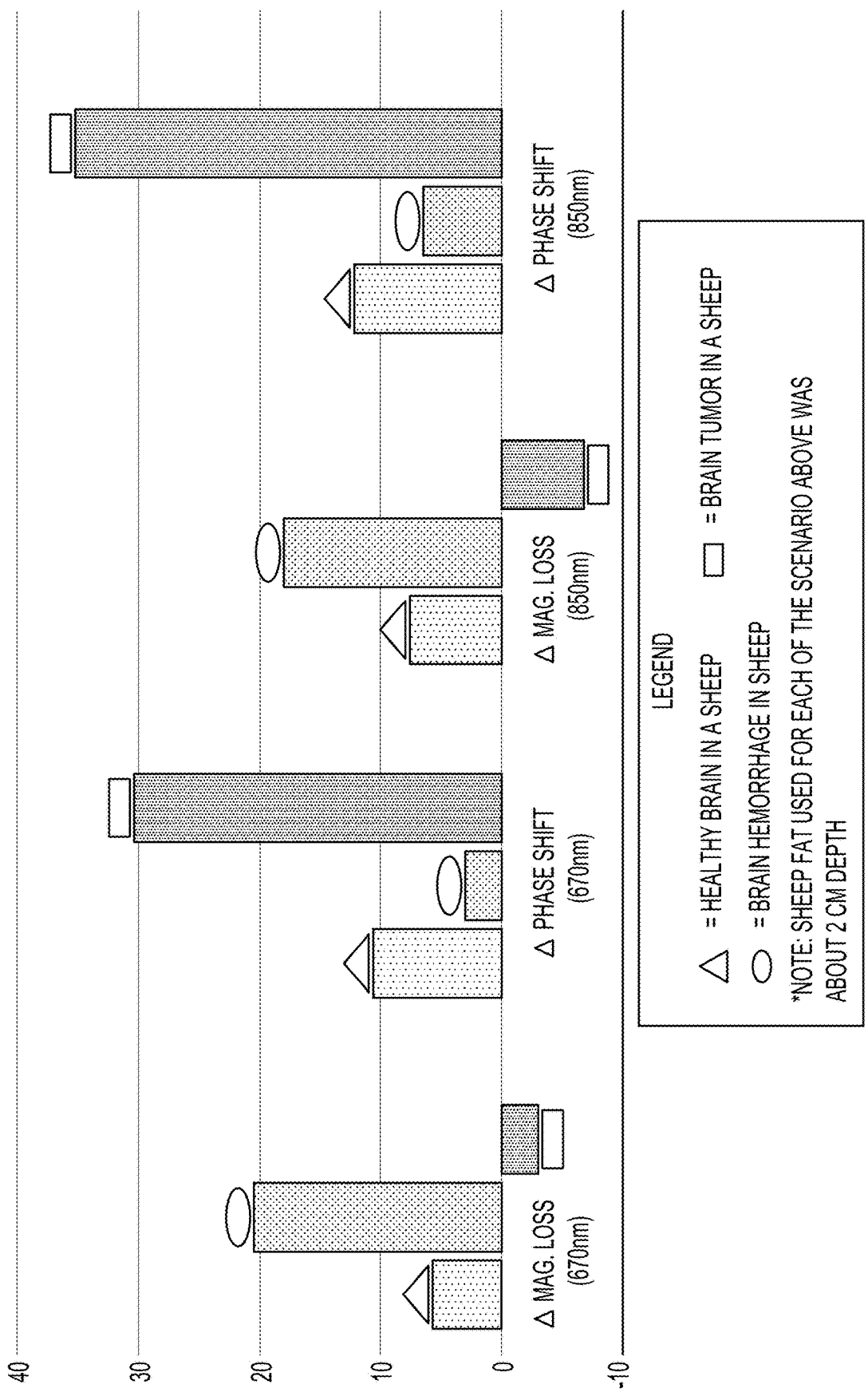
FIG. 12 is a graph comparing A magnitude loss and A phase shift results for the method of detecting brain abnormalities using backscattered light for cases including a sheep having a healthy brain, a brain tumor, and a brain hemorrhage using sheep fat at about 2 cm depth.
Figure 13:
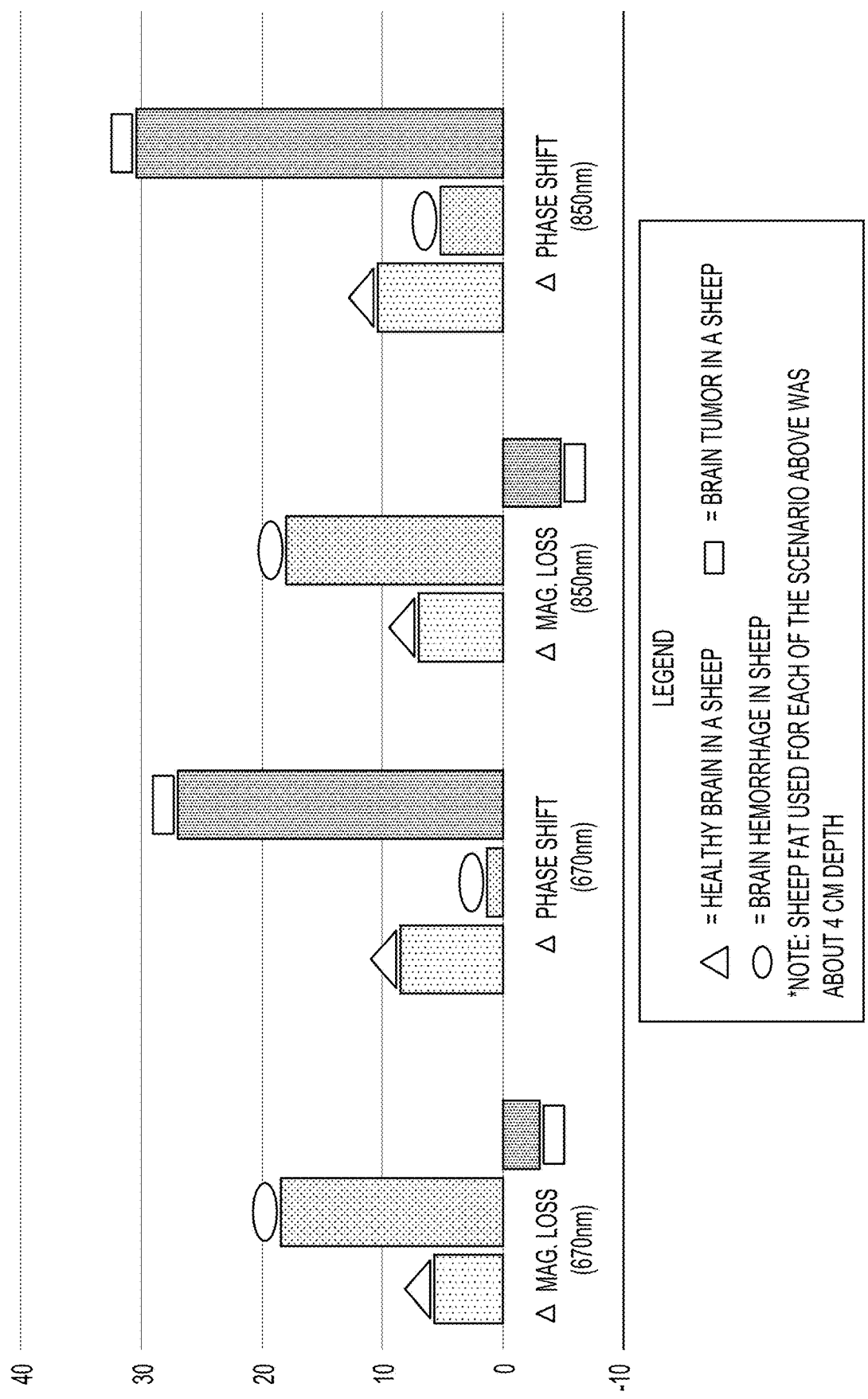
FIG. 13 is a graph comparing A magnitude loss and A phase shift results for the method of detecting brain abnormalities using backscattered light for cases including a sheep having a healthy brain, a brain tumor, and a brain hemorrhage using sheep fat at about 4 cm depth.

FIGS. 12-13 show healthy sheep fat with India ink to simulate a healthy brain, sheep fat with a higher level of India ink to simulate a brain hemorrhage, and sheep fat with jelly candies therein to simulate brain tumors with the respective size depths (about 2 cm depth in FIG. 12 and about 4 cm depth in FIG. 13) of the sheep fat. As shown in FIGS. 12-13, the brain hemorrhage and brain tumors have the highest Δ magnitude loss (insertion loss ($I_L$)) and the lowest Δ magnitude loss, respectively, for wavelengths of 670 nm and 850 nm at about 2 cm depth (FIG. 12) and about 4 cm depth (FIG. 13) of sheep fat. However, the brain tumors and brain hemorrhage have the highest Δ phase shift (insertion phase difference ($I_{PD}$)) and the lowest Δ phase shift, respectively, for wavelengths of 670 nm and 850 nm at about 2 cm depth (FIG. 12) and about 4 cm depth (FIG. 13) of sheep fat. Corresponding data are shown in Tables 5-6, respectively showing the data for about 2 cm depth (FIG. 12) and about 4 cm depth (FIG. 13) of sheep fat with Δ magnitude loss and Δ phase shift at 670 nm and 850 nm.

TABLE 5

| | Δ Magnitude Loss (670 nm) | Δ Phase Shift (670 nm) | Δ Magnitude Loss (850 nm) | Δ Phase Shift (850 nm) |
|---|---|---|---|---|
| Healthy fat w/about 2 cm depth | 5.89 | 10.56 | 7.68 | 12.33 |
| Hemorrhage w/about 2 cm depth | 20.6 | 3.22 | 18.11 | 6.55 |
| Tumor w/ about 2 cm depth | −3.25 | 30.33 | −6.72 | 35.56 |

TABLE 6

| | Δ Magnitude Loss (670 nm) | Δ Phase Shift (670 nm) | Δ Magnitude Loss (850 nm) | Δ Phase Shift (850 nm) |
|---|---|---|---|---|
| Healthy fat w/about 4 cm depth | 5.89 | 8.57 | 7.23 | 10.53 |
| Hemorrhage w/about 4 cm depth | 18.40 | 1.40 | 17.99 | 5.23 |
| Tumor w/ about 4 cm depth | −3.25 | 27.33 | −5.02 | 30.80 |

Figure 14:
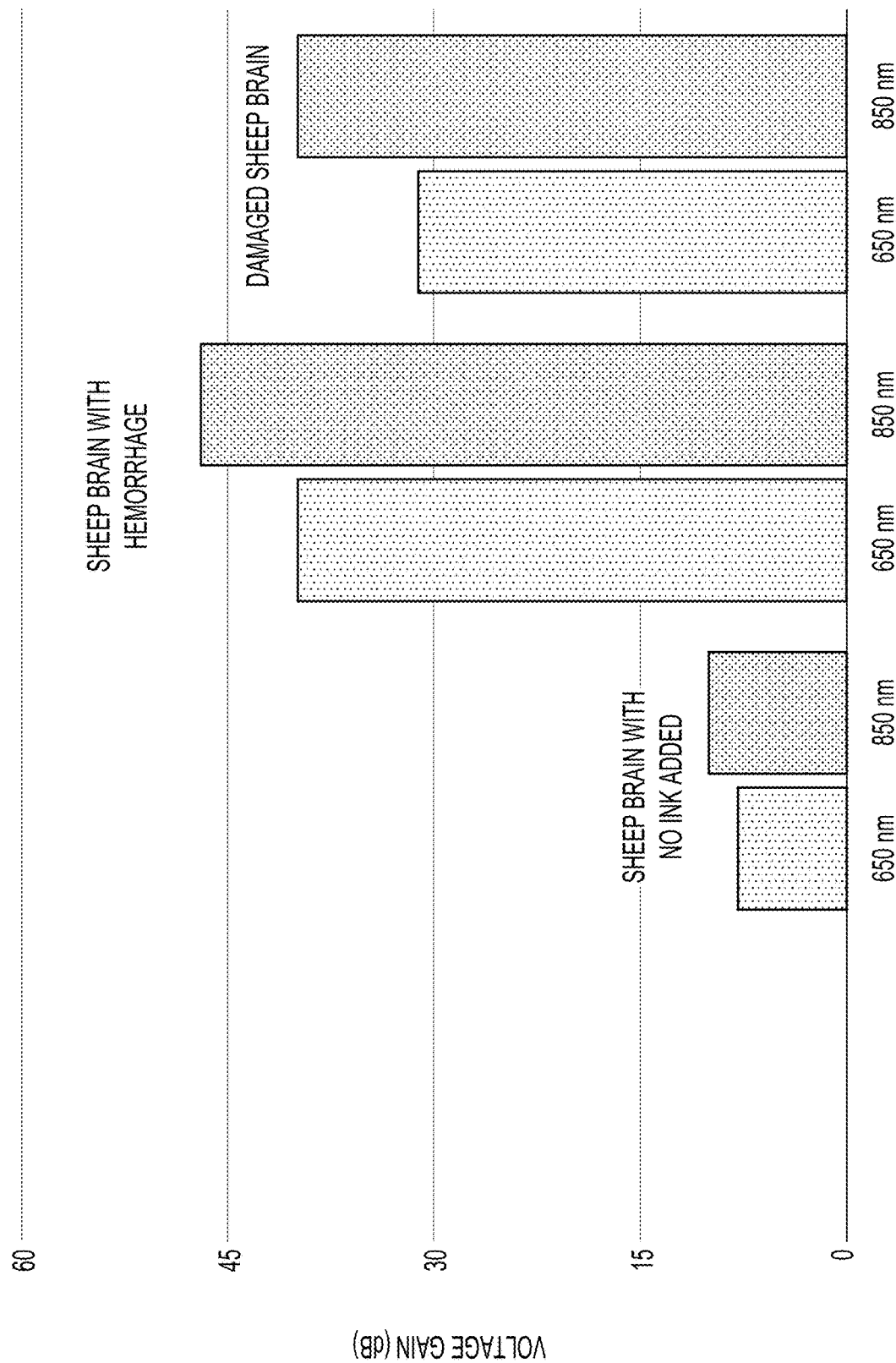
FIG. 14 is a graph comparing voltage gain results for the method of detecting brain abnormalities using backscattered light for cases including a sheep having a healthy brain, a brain damage, and a brain hemorrhage.

FIG. 14 depicts a sheep brain with no ink added to simulate a healthy brain, a sheep brain infused with India ink to simulate a brain hemorrhage, and a sheep brain with India ink and jelly candy to simulate a brain damaged with corresponding wavelengths. As shown in the figure, the sheep brain with the hemorrhage has the most voltage gains of about 40 dB and about 47 dB at about 650 nm and about 850 nm, respectively. On the other hand, a sheep brain with no ink added has the lowest voltage gains of about 8 dB and about 10 dB at about 650 nm and about 850 nm, respectively. Corresponding data is shown in Table 7, showing the voltage gain at 650 nm and 850 nm for various sheep brain conditions.

TABLE 7

| Sheep Brain Conditions | 650 nm (voltage gain in dB) | 850 nm (voltage gain in dB) |
|---|---|---|
| Sheep brain w/ no ink added | 8 | 10 |
| Sheep brain w/ hemorrhage | 40 | 47 |
| Damaged sheep brain | 31 | 40 |

Figure 15:
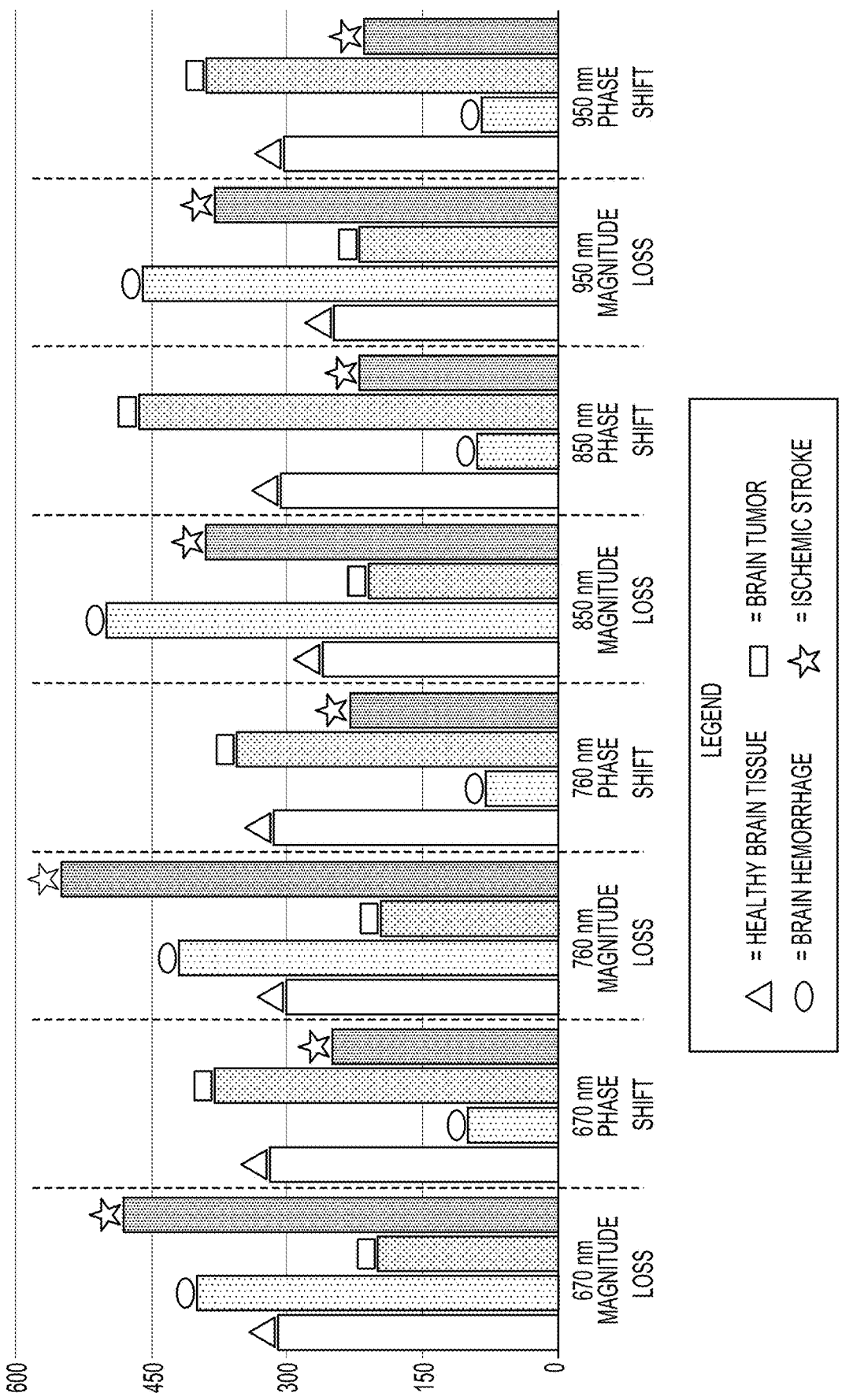
FIG. 15 is a graph comparing A magnitude loss and A phase shift results for the method of detecting brain abnormalities using backscattered light for cases including a sheep having a healthy brain, and a brain hemorrhage, a brain tumor, and a brain ischemic stroke.

FIG. 15 depicts absorption (magnitude loss) and scattering (phase shift) of NIR light at various wavelengths for various sheep brain conditions (i.e., sheep healthy brain tissue, a sheep brain with India ink to simulate a brain hemorrhage, a sheep brain with jelly candy to simulate brain tumors, and a sheep brain with an external device placed therein to gently exert pressure on the cerebral artery thereby imitating blockage to simulate ischemic stroke). As shown in the figure, ischemic stroke has the highest magnitude loss at 670 nm and 760 nm due to the deoxygenated hemoglobin being sensitive to those wavelengths. However, at 850 nm and 950 nm, the brain hemorrhage has the highest magnitude loss due to oxygenated hemoglobin being sensitive to those wavelengths. For all the wavelengths, the tumors have the lowest magnitude loss. As for phase shift, the brain tumors have the highest phase shift for all the wavelengths which indicate high scattering of NIR light due to heterogeneous nature of tumor tissue. Conversely, the brain hemorrhage has the lowest phase shift for all the wavelengths, which indicates low scattering of NIR light due to homogeneous nature of pooling blood. Corresponding data is shown in Table 8, showing the magnitude loss and phase shift at various wavelengths for various sheep brain conditions.

TABLE 8

| Sheep Brain Conditions | Mag. Loss (670 nm) | Phase Shift (670 nm) | Mag. Loss (760 nm) | Phase Shift (760 nm) | Mag. Loss (850 nm) | Phase Shift (850 nm) | Mag. Loss (950 nm) | Phase Shift (950 nm) |
|---|---|---|---|---|---|---|---|---|
| Healthy brain tissue | 310 | 320 | 300 | 315 | 260 | 310 | 250 | 305 |
| Brain hemorrhage | 400 | 100 | 420 | 80 | 500 | 90 | 460 | 85 |
| Brain tumor | 200 | 380 | 200 | 360 | 210 | 465 | 220 | 390 |
| Ischemic stroke | 480 | 250 | 550 | 230 | 390 | 220 | 380 | 215 |

It is to be understood that the system and method for detecting brain abnormalities using backscattered radiation are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of detecting brain abnormalities in a brain of a patient using backscattered light, the method comprising the steps of:
    generating at least one pulsed incident beam of light with at least one light source;
    directing the at least one pulsed incident beam of light toward a portion of the brain of the patient;
    applying an RF electromagnetic field toward the portion of the brain of the patient;
    receiving at least one backscattered beam of light from the portion of the brain of the patient;
    calculating an insertion loss ($I_L$) and an insertion phase difference ($I_{PD}$) of the at least one backscattered beam of light; and
    determining if the patient has a brain abnormality based on the calculated insertion loss and the calculated insertion phase difference.

2. The method of detecting the brain abnormalities in the brain of the patient using backscattered light of claim 1, wherein the at least one pulsed incident beam of light comprises near infrared light.

3. The method of detecting the brain abnormalities in the brain of the patient using backscattered light of claim 2, wherein the at least one pulsed incident beam of light and the RF electromagnetic field are applied simultaneously toward the portion of the brain of the patient to modulate brain tissue dielectric properties.

4. The method of detecting the brain abnormalities in the brain of the patient using backscattered light of claim 3, wherein the modulation of the brain tissue dielectric properties reduces scattering and absorption losses of photons of the near infrared light in the brain tissue.

5. The method of detecting the brain abnormalities in the brain of the patient using backscattered light of claim 3, wherein the brain tissue dielectric properties comprise complex permittivity ($\epsilon^*$) and permeability ($\mu^*$).

6. The method of detecting the brain abnormalities in the brain of the patient using backscattered light of claim 2, further comprising:
    prior to the calculation step, generating two output analog voltages via a comparator microchip based on signals from the at least one backscattered beam of light and the RF electromagnetic field; and
    digitizing the two output analog voltages to generate multiple discrete iterations of signal samples (s[n]).

7. The method of detecting the brain abnormalities in the brain of the patient using backscattered light of claim 6, wherein the calculated insertion loss ($I_L$) and the calculated insertion phase difference ($I_{PD}$) are discrete time-domain digital signals based on the multiple discrete iterations of signal samples (s[n]).

8. The method of detecting the brain abnormalities in the brain of the patient using backscattered light of claim 7, further comprising calculating a pulsed RF signal-frequency domain (R(f)) based on the discrete time-domain digital signals of the calculated insertion loss ($I_L$) and the calculated insertion phase difference ($I_{PD}$).

9. The method of detecting the brain abnormalities in the brain of the patient using backscattered light of claim 8, further comprising:
    generating a frequency-domain data by converting the discrete time-domain digital signals of the calculated insertion loss ($I_L$) and the calculated insertion phase difference ($I_{PD}$) to frequency-domain using a Fourier transform;
    reducing noise on the generated frequency-domain data; and
    calculating a frequency spectrum (S(f)) based on the noise reduced frequency-domain data.

10. The method of detecting the brain abnormalities in the brain of the patient using backscattered light of claim 9, further comprising calculating a cross-spectral density ($S_{xy}(f)$) based on the calculated pulsed RF signal-frequency domain (R(f)) and the calculated frequency spectrum (S(f)).

11. The method of detecting the brain abnormalities in the brain of the patient using backscattered light of claim 10, further comprising:
    sampling signals of the at least one pulsed incident beam of light to obtain sampled pulsed signals;
    optionally applying a window function to each of the sampled pulsed signals; and
    applying a discrete Fourier transform to each of the sampled pulsed signals to compute a frequency-domain representation (S[k]).

12. The method of detecting the brain abnormalities in the brain of the patient using backscattered light of claim 11, wherein the cross-spectral density ($S_{xy}(f)$) and the frequency-domain representation (S[k]) are inputted into deep learning model integrations.

13. The method of detecting the brain abnormalities in the brain of the patient using backscattered light of claim 12, wherein the deep learning model integrations are selected from the group consisting of convolutional neural networks (CNN), a long short-term memory (LSTM), a transformer module, an U-Net 2.5D module, and a combination thereof.

14. The method of detecting the brain abnormalities in the brain of the patient using backscattered light of claim 13, wherein the cross-spectral density ($S_{xy}(f)$) and the frequency-domain representation (S[k]) are inputted into the convolutional neural networks (CNN) to extract local spatial features data from the discrete time-domain digital signals of the calculated insertion loss ($I_L$) and the calculated insertion phase difference ($I_{PD}$).

15. The method of detecting the brain abnormalities in the brain of the patient using backscattered light of claim 14, wherein the extracted local spatial features data are inputted into the long short-term memory (LSTM) for capturing temporal dependencies in sequential data thereby detecting dynamic changes in brain activity.

16. The method of detecting the brain abnormalities in the brain of the patient using backscattered light of claim 15, wherein the captured temporal dependencies are combined with the transformer module to capture global context data and long-range dependencies data in the at least one backscattered beam of light data.

17. The method of detecting the brain abnormalities in the brain of the patient using backscattered light of claim 16, wherein the captured global context data and the long-range dependencies data are inputted into an encoder-decoder architecture with skip connections with the U-Net 2.5D module to segment the respective data thereby localizing abnormalities and preserving spatial resolution during upsampling.

18. A method of detecting brain abnormalities in a brain of a patient using backscattered light, the method comprising the steps of:
  generating at least one pulsed incident beam of light with at least one light source;
  directing the at least one pulsed incident beam of light toward a portion of the brain of the patient;
  receiving at least one backscattered beam of light from the portion of the patient's brain;
  calculating an insertion loss, $I_L$, as $$I_L = 20\log\frac{A_{BS}}{A_I},$$

wherein $A_{BS}$ is an amplitude of the at least one backscattered beam of light, and wherein $A_I$ is an amplitude of the at least one pulsed incident beam of light;
  calculating an insertion phase difference, $I_{PD}$, as $I_{PD}=\phi_{BS}-\phi_I$, wherein $\phi_{BS}$ is a phase of the at least one backscattered beam of light, and wherein $\phi_I$ is a phase of the at least one pulsed incident beam of light; and
  determining if the patient has a brain abnormality based on the calculated insertion loss and the calculated insertion phase difference.

19. The method of detecting the brain abnormalities in the brain of the patient using backscattered light of claim 18, further comprising measuring the amplitude of the at least one backscattered beam of light and the phase of the at least one backscattered beam of light using a comparator microchip prior to the steps of calculating the insertion loss and calculating the insertion phase difference.

20. A system for detecting brain abnormalities in a brain of a patient using backscattered light, the system comprising:
  a headband configured to be worn on a head of a patient, wherein the headband comprises:
    at least one light source configured to generate at least one pulsed incident beam of light directed toward a portion of the brain of the patient;
    at least one detector configured to detect at least one backscattered beam of light from the portion of the brain of the patient; and
    a controller configured to calculate an insertion loss, $I_L$, as $$I_L = 20\log\frac{A_{BS}}{A_I}$$

and an insertion phase difference, $I_{PD}$, as $I_{PD}=\phi_{BS}-\phi_I$, wherein $A_{BS}$ is an amplitude of the at least one backscattered beam of light, wherein $A_I$ is an amplitude of the at least one pulsed incident beam of light, wherein $\phi_{BS}$ is a phase of the at least one backscattered beam of light, and wherein $\phi_I$ is a phase of the at least one pulsed incident beam of light;
    wherein the controller is configured to determine if the patient has a brain abnormality based on the calculated insertion loss and the calculated insertion phase difference.

\* \* \* \* \*